(12) United States Patent
Hoshino et al.

(10) Patent No.: US 11,385,166 B2
(45) Date of Patent: *Jul. 12, 2022

(54) COVER FILM FOR TESTING, TESTING MEMBER, AND METHOD OF MANUFACTURING COVER FILM FOR TESTING

(71) Applicant: LINTEC CORPORATION, Tokyo (JP)

(72) Inventors: Hiroki Hoshino, Tokyo (JP); Masaya Todaka, Tokyo (JP); Tomoo Orui, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 16/999,681

(22) Filed: Aug. 21, 2020

(65) Prior Publication Data

US 2020/0400552 A1 Dec. 24, 2020

Related U.S. Application Data

(63) Continuation of application No. 15/924,394, filed on Mar. 19, 2018, now Pat. No. 10,788,414.

(30) Foreign Application Priority Data

Apr. 7, 2017 (JP) .............................. JP2017-076699

(51) Int. Cl.
*G01N 21/03* (2006.01)
*B32B 3/30* (2006.01)
(Continued)

(52) U.S. Cl.
CPC .... *G01N 21/0303* (2013.01); *B01L 3/502707* (2013.01); *B32B 3/30* (2013.01);
(Continued)

(58) Field of Classification Search
CPC ........... B32B 3/30; B32B 27/06; B32B 37/06; B32B 2307/412; B32B 2309/105;
(Continued)

(56) References Cited

U.S. PATENT DOCUMENTS 4,761,381 A 8/1988 Blatt et al.
6,037,168 A * 3/2000 Brown ................ B01L 3/50853
435/288.3
(Continued)

FOREIGN PATENT DOCUMENTS

JP 2006-030160 A 2/2006
JP 2006-510384 A 3/2006
(Continued)

OTHER PUBLICATIONS

Office Action dated Dec. 1, 2020 issued in corresponding JP patent application No. 2017-076699 (and English translation).

*Primary Examiner* — Michael P LaPage
(74) *Attorney, Agent, or Firm* — Posz Law Group, PLC

(57) ABSTRACT

[Problems] Objects include providing a cover film for testing which can be well fixed to a substrate having a groove and with which a material that constitutes an adhesive layer does not invade into the groove and a specimen can be easily stored in the groove, providing a testing member including the cover film for testing, and providing a method of manufacturing the cover film for testing.
[Solution] The cover film for testing (1) comprises a base material (10), a hydrophilic coating layer (20) laminated on a surface of the base material (10), and an adhesive layer (30) partially laminated on a surface of the hydrophilic coating layer (20) opposite to the base material (10), whereby the cover film for testing (1) has a region in which the adhesive layer (30) is absent and the hydrophilic coating layer (20) is exposed.

9 Claims, 4 Drawing Sheets

(51) Int. Cl.
  *B32B 7/14* (2006.01)
  *B32B 7/05* (2019.01)
  *B01L 3/00* (2006.01)

(52) U.S. Cl.
  CPC ............... *B32B 7/05* (2019.01); *B32B 7/14* (2013.01); *B01L 2300/0887* (2013.01); *B01L 2300/161* (2013.01); *B32B 2255/28* (2013.01); *B32B 2307/412* (2013.01); *G01N 2021/0346* (2013.01)

(58) Field of Classification Search
  CPC ........... G01N 2021/6482; G01N 21/51; G01N 2021/0378; G01N 2021/0357; G01N 21/03–21/07; B01L 3/50–3/5088; B01L 3/5027–3/502707
  USPC .................................................. 356/244–246
  See application file for complete search history.

(56) References Cited

U.S. PATENT DOCUMENTS

| | | | |
|---|---|---|---|
| 6,074,725 A | 6/2000 | Kennedy | |
| 6,143,496 A * | 11/2000 | Brown | B01L 3/5027 422/504 |
| 2003/0214650 A1 | 11/2003 | Dietz et al. | |
| 2004/0022677 A1 * | 2/2004 | Wohlstadter | G01N 21/66 422/52 |
| 2004/0197231 A1 | 10/2004 | Katsuki et al. | |
| 2007/0276972 A1 | 11/2007 | Kikuchi et al. | |
| 2009/0051901 A1 | 2/2009 | Shen et al. | |
| 2009/0060782 A1 | 3/2009 | Shimasaki | |
| 2012/0295781 A1 | 11/2012 | Amasia et al. | |
| 2013/0333417 A1 | 12/2013 | Prim | |
| 2015/0327633 A1 | 11/2015 | Barker et al. | |
| 2015/0328633 A1 | 11/2015 | Yoo et al. | |
| 2016/0023209 A1 | 1/2016 | Lenigk et al. | |
| 2016/0038940 A1 * | 2/2016 | Babcock | B01L 3/502715 422/68.1 |
| 2016/0082434 A1 * | 3/2016 | Hiller | B01L 3/502707 422/412 |

FOREIGN PATENT DOCUMENTS

| | | |
|---|---|---|
| JP | 2008-157644 A | 7/2008 |
| JP | 2011-169603 A | 9/2011 |
| JP | 2017-026579 A | 2/2017 |
| WO | 2004/058405 A1 | 7/2004 |
| WO | 2017/061600 A1 | 4/2017 |

* cited by examiner

COVER FILM FOR TESTING, TESTING MEMBER, AND METHOD OF MANUFACTURING COVER FILM FOR TESTING

CROSS REFERENCE TO RELATED APPLICATIONS

This application is a continuation of U.S. patent application Ser. No. 15/924,394 filed on Mar. 19, 2018, which is based on and claims priority to Japanese Patent Application No. 2017-076699 filed on Apr. 7, 2017, the disclosures of which are incorporated herein by reference.

TECHNICAL FIELD

The present invention relates to a testing member used for optically testing a specimen, a cover film for testing used therein, and a method of manufacturing the cover film for testing.

BACKGROUND ART

A method of optically testing a specimen exists for the purposes of measuring the turbidity of a specimen such as liquid and measuring the amount of a specific component in the specimen, etc. In such an optical testing method, the specimen is irradiated with light to measure light that is caused by the irradiation. More specific examples of such a testing method include a method of irradiating a specimen with light and measuring the degree of scattering of the light, a method of measuring an amount of absorption of light by a component in a specimen when the specimen is irradiated with light and the light transmits through the specimen, and a method of measuring fluorescence generated in a specimen. In such a testing method, conventionally, the specimen has been stored in a test tube or cell having an appropriate volume, such as several milliliters.

In recent years, a testing method has been developed which uses a testing member provided with a fine groove for storing a specimen, as substitute for the above test tube or cell. In such a method, the test is possible even for a small amount of the specimen and thus requires only a slight amount of the specimen. Moreover, the use of a testing member having a plurality of grooves enables collective measurement and a number of specimens can therefore be tested at the same time.

Patent Literature 1 discloses a multi-layered composite structure as an example of the above-described testing member having fine grooves. The multi-layered composite structure comprises a base material that constitutes side surfaces of the grooves, a first layer that constitutes bottom surfaces of the grooves, and a resealable film as a cover that covers the grooves (paragraph 0032 and FIG. 2 of Patent Literature 1). Patent Literature 2 discloses a plastic microchip in which a plastic substrate that has a fine flow channel as the above groove at the surface and a plastic film as a cover that covers the groove are bonded together via an adhesive (claim 1 of Patent Literature 2).

PRIOR ART LITERATURE

Patent Literature

[Patent Literature 1] Japanese Translation of PCT International Application, No. 2006-510384
[Patent Literature 2] JP2008-157644A

SUMMARY OF THE INVENTION

Problems to be Solved by the Invention

As installed in the testing members described in Patent Literature 1 and Patent Literature 2, the grooves may be covered by a cover to prevent troubles, such as vaporization and leakage of specimens and pollution of specimens. Such a cover has to be well fixed to the substrate in order to prevent its delamination and dropping from the substrate provided with the grooves. Such a cover may therefore be fixed to the substrate using an adhesive or a pressure sensitive adhesive. For example, in Patent Literature 2, the plastic film is adhered using an adhesive to the surface of the plastic substrate having the fine flow channel.

In the conventional fixing method as disclosed in Patent Literature 2, however, the adhesive or pressure sensitive adhesive used may invade into the groove of the substrate and/or fill the groove. In this case, the test cannot be well performed because the specimen cannot be sufficiently stored in the groove.

In addition, the testing member in which the grooves are covered by a cover as described above requires costly and complex means for storing specimens in the grooves. For example, in the testing member disclosed in Patent Literature 1, the testing member is rotated to generate centrifugal force, which is utilized to store the specimens at certain positions of the grooves (paragraph 0033 of Patent Literature 1). In the testing member disclosed in Patent Literature 2, the specimen is sent to the groove using a pump (paragraph 0031 of Patent Literature 2). Thus, a testing member is needed with which a specimen can be easily stored in a groove without using such costly and complex means.

The present invention has been made in consideration of such actual circumstances and an object of the present invention is to provide a cover film for testing which can be well fixed to a substrate having a groove and with which a material that constitutes an adhesive layer does not invade into the groove and a specimen can be easily stored in the groove. Another object of the present invention is to provide a testing member including the cover film for testing. A further object of the present invention is to provide a method of manufacturing the cover film for testing.

Means for Solving the Problems

To achieve the above objects, first, the present invention provides a cover film for testing comprising: a base material; a hydrophilic coating layer laminated on a surface of the base material; and an adhesive layer partially laminated on a surface of the hydrophilic coating layer opposite to the base material, whereby the cover film for testing has a region in which the adhesive layer is absent and the hydrophilic coating layer is exposed (Invention 1).

The cover film for testing according to the above invention (Invention 1) includes the adhesive layer and can thereby be well fixed to a substrate. Moreover, the cover film for testing has the region in which the adhesive layer is absent, and the region can thereby be overlapped with a groove of the substrate in the plan view when a testing member is assembled. This can prevent a material that constitutes the adhesive layer from invading into the groove of the substrate. Furthermore, the cover film for testing includes the hydrophilic coating layer and has an exposed region of the hydrophilic coating layer. A specimen can thereby be stored in the groove utilizing wettability and the specimen can easily be stored in the groove without using costly and complex means. As a result of these, the use of the cover film for testing allows a testing member to be obtained with which the test can be well performed.

In the above invention (Invention 1), the exposed surface of the hydrophilic coating layer may preferably have a water contact angle of 0° or more and 60° or less (Invention 2).

In the above invention (Invention 1, 2), the hydrophilic coating layer may preferably be composed of a material that contains at least one selected from a siloxane-based component, a silica-based component, and an acrylic-based component (Invention 3).

In the above invention (Invention 1 to 3), the adhesive layer may preferably comprise at least one selected from a pressure sensitive adhesive and a thermoplastic resin (Invention 4).

In the above invention (Invention 1 to 4), the base material and the hydrophilic coating layer may preferably have transparency to light used in a test (Invention 5).

Second, the present invention provide a testing member comprising: a substrate having a surface provided with at least one groove; and a cover film laminated on the surface of the substrate provided with the groove, the cover film being the above cover film for testing (Invention 1 to 5), the testing member being for performing an optical test for a specimen stored in the groove (Invention 6).

In the above invention (Invention 6), in the cover film for testing, the region in which the adhesive layer is absent may preferably overlap with the groove of the substrate in a plan view (Invention 7).

In the above invention (Invention 6, 7), the substrate may preferably have transparency to light used in the test (Invention 8).

Third, the present invention provides a method of manufacturing the above cover film for testing (Invention 1 to 5), the method comprising: a step of forming the hydrophilic coating layer on a surface of the base material; and a step of partially forming the adhesive layer on a surface of the hydrophilic coating layer opposite to the base material (Invention 9).

In the above invention (Invention 9), the adhesive layer may preferably be formed by screen printing of a material on the surface of the hydrophilic coating layer opposite to the base material, wherein the material forms the adhesive layer (Invention 10).

Advantageous Effect of the Invention

The cover film for testing of the present invention can be well fixed to a substrate having a groove, a material that constitutes the adhesive layer does not invade into the groove, and a specimen can be easily stored in the groove. Moreover, the cover film for testing of the present invention can be used to well perform the test. Furthermore, according to the method of manufacturing the cover film for testing of the present invention, the cover film for testing as the above can be manufactured.

EMBODIMENTS FOR CARRYING OUT THE INVENTION

Hereinafter, one or more embodiments of the present invention will be described.

<Cover Film for Testing>

Figure 1:
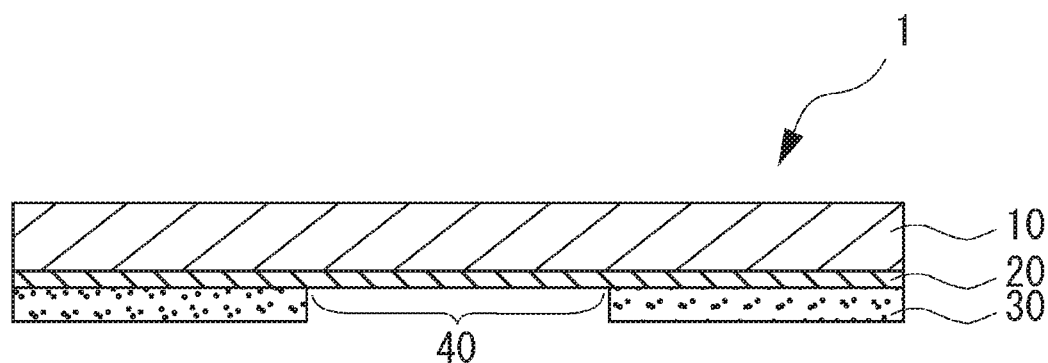
FIG. 1 is a cross-sectional view of a cover film for testing according to one or more embodiments of the present invention.

FIG. 1 illustrates a cover film for testing 1 according to the present embodiment. The cover film for testing 1 comprises a base material 10, a hydrophilic coating layer 20 laminated on a surface of the base material 10, and an adhesive layer 30 partially laminated on a surface of the hydrophilic coating layer 20 opposite to the base material 10. In the cover film for testing 1, the adhesive layer 30 is partially laminated on the surface of the hydrophilic coating layer 20 opposite to the base material 10 thereby to allow a region to exist in which the adhesive layer 30 is absent and the hydrophilic coating layer 20 is exposed (this region may be referred to as a "hydrophilic coating layer exposed part 40," hereinafter).

Figure 2:
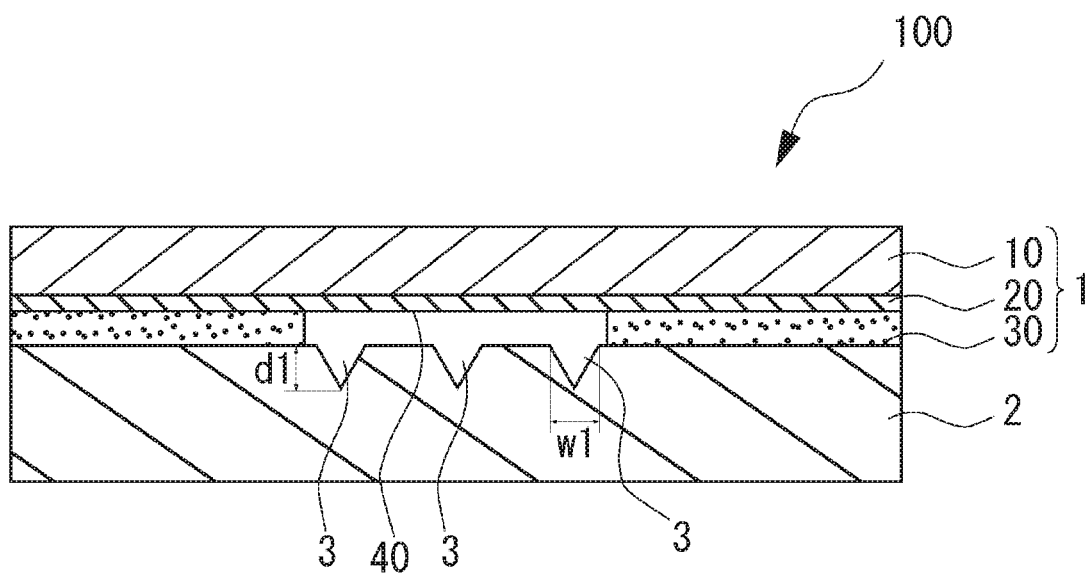
FIG. 2 is a cross-sectional view of a testing member according to one or more embodiments of the present invention.

The cover film for testing 1 according to the present embodiment may be for constituting a testing member used in a test and may preferably be for constituting a testing member 100 as illustrated in FIG. 2. The testing member 100 comprises a substrate 2 having a surface provided with at least one or more grooves 3 and the cover film for testing 1 laminated on the surface of the substrate 2 provided with the grooves 3 and may be for performing an optical test for a specimen stored in the grooves 3. As illustrated in FIG. 2, the hydrophilic coating layer exposed part 40 of the cover film for testing 1 according to the present embodiment is provided at a position that overlaps with the grooves 3 of the substrate 2 in the plan view.

In the cover film for testing 1 according to the present embodiment, the adhesive layer 30 can be used to attach the cover film for testing 1 and the substrate 2 to each other and the cover film for testing 1 can therefore be well fixed to the substrate 2.

Moreover, in the cover film for testing 1 according to the present embodiment, when the testing member 100 is assembled, the hydrophilic coating layer exposed part 40 can be overlapped with the grooves 3 of the substrate 2 in the plan view, as previously described. In the testing member 100 thus obtained, a material that constitutes the adhesive layer 30 does not overlap with the grooves 3 present on the substrate 2 in the plan view. This can avoid the above material from invading into the grooves 3 or filling the grooves 3.

Furthermore, the cover film for testing 1 according to the present embodiment includes the hydrophilic coating layer 20 and has the hydrophilic coating layer exposed part 40. When a specimen is stored in the grooves 3 of the assembled testing member 100, therefore, the specimen comes into contact with the surface of the hydrophilic coating layer exposed part 40 (the surface of the hydrophilic coating layer 20 opposite to the base material 10). This surface is compatible with an aqueous liquid used as the specimen, and the specimen can therefore well wet the surface and spread on the surface. This promotes the capillary phenomenon when the specimen is stored in the grooves 3, and the specimen readily spreads throughout the entire grooves 3. As a result, it is possible to easily store the specimen in the entire grooves 3.

As the above, the cover film for testing 1 according to the present embodiment can be well fixed to the substrate 2, the material which constitutes the adhesive layer does not invade into the grooves 3 of the substrate 2, and the specimen can be easily stored in the entire grooves 3. Thus, the cover film for testing 1 according to the present embodiment can be used to obtain the testing member 100 with which the test can be well performed.

In the cover film for testing 1 according to the present embodiment, the arrangement of the adhesive layer 30 and the hydrophilic coating layer exposed part 40 can be appropriately set in accordance with the positions of the grooves 3 of the substrate 2 on which the cover film for testing 1 is laminated. In particular, when the cover film for testing 1 according to the present embodiment is laminated on the substrate 2 as illustrated in FIG. 2, it suffices that the adhesive layer 30 does not exist at least in a region that overlaps with the grooves 3 in the plan view of the assembled testing member 100. That is, the location of the hydrophilic coating layer exposed part 40 may extend into a region that does not overlap with the grooves 3 in the plan view when the testing member 100 is assembled.

1. Configuration of Cover Film for Testing
(1) Base Material

In the cover film for testing 1 according to the present embodiment, the configuration of the base material 10 is not particularly limited, provided that the test can be performed using the testing member 100 which includes the base material 10. From the viewpoint of enabling a good test, it may be preferred for the base material 10 to have transparency to light used in the test (which may be referred to as "testing light," hereinafter).

As a material of the base material 10, a resin film, glass, and other appropriate material can be used, among which the resin film may preferably be used from the viewpoint of easy production and easy handling. Examples of the resin film include a polycarbonate film, films of polyester, such as polyethylene terephthalate, polybutylene terephthalate and polyethylene naphthalate, films of polyolefin, such as polyethylene and polypropylene, cellophane, a diacetyl cellulose film, triacetyl cellulose film, acetyl cellulose butyrate film, polyvinyl chloride film, polyvinylidene chloride film, polyvinyl alcohol film, ethylene-vinyl acetate copolymer film, polystyrene film, polymethylpentene film, polysulfone film, polyether ether ketone film, polyether sulfone film, polyetherimide film, polyimide film, fluorine resin film, polyamide film, acrylic resin film, norbornene-based resin film, cycloolefin resin film, polyphenylene sulfide film, and liquid-crystal polymer film. These films may be in a single layer or may also be in a multilayer obtained by laminating two or more layers of the same type or different types.

Among the above resin films, the polycarbonate film, polyethylene terephthalate film, polybutylene terephthalate film, cycloolefin resin film, or acrylic resin film may preferably be used and the polycarbonate film may be particularly preferably used from the viewpoint of excellent transparency to the testing light. Details of the testing light will be described later.

The same material as that of the substrate 2 may preferably be used as a material of the base material 10. The use of the same material can reduce the difference in the transparency to the testing light between the base material 10 and the substrate 2 and the influence of such a difference on the measurement can be reduced.

In the cover film for testing 1 according to the present embodiment, the transmittance of the testing light through the base material 10 may be preferably 60% or higher, particularly preferably 80% or higher, and further preferably 90% or higher. The above transmittance being 60% or higher allows the cover film for testing 1 to have better transparency to the testing light. As a result, in the testing member 100 obtained using the cover film for testing 1, the testing can be more accurately performed. The upper limit of the above transmittance is not particularly limited and may be 100% or lower.

In the cover film for testing 1 according to the present embodiment, the haze value of the base material 10 may be preferably 10% or less, particularly preferably 5% or less, and further preferably 1% or less. The haze value of the base material 10 being 10% or less can effectively reduce the scattering of the testing light in the base material 10. In the testing member 100 obtained using the cover film for testing 1, therefore, the testing can be more accurately performed. The lower limit of the haze value of the base material 10 is not particularly limited, but may ordinarily be 0% or more. The haze value as used in the present description refers to a value that is measured in accordance with JIS K7136: 2000.

For the purpose of improving the interfacial adhesion of the base material 10 with the hydrophilic coating layer 20, the base material 10 can be subjected to surface treatment, such as using an oxidation method and roughening method, or primer treatment, provided that the transparency to the testing light is not impaired. Examples of the above oxidation method include corona discharge treatment, plasma discharge treatment, chromium oxidation treatment (wet type), flame treatment, hot-air treatment, ozone exposure treatment, and ultraviolet ray irradiation treatment. Examples of the roughening method include a sandblast method and thermal spraying method. These surface treatment methods may be appropriately selected in accordance with the type of the material which constitutes the base material 10.

The thickness of the base material 10 may be preferably 30 μm or more, particularly preferably 50 μm or more, and further preferably 75 μm or more. From another aspect, the thickness may be preferably 300 μm or less, particularly preferably 200 μm or less, and further preferably 150 μm or less. The thickness of the base material 10 being 30 μm or more allows the base material 10 to have sufficient strength to improve the handling ability and it is possible to suppress the deformation and breakage of the base material 10 when the testing member 100 is used. The thickness of the base material 10 being 300 μm or less allows the base material 10 to readily have excellent transparency to the testing light and the test may be well performed in the obtained testing member 100.

(2) Hydrophilic Coating Layer

In the cover film for testing 1 according to the present embodiment, the material which constitutes the hydrophilic coating layer 20 is not particularly limited, provided that the surface of the obtained hydrophilic coating layer 20 has desired wettability with a specimen and does not adversely affect the test. The material may be preferably a material that includes a functional group having hydrophilicity and particularly preferably a material that includes a large number of functional groups having hydrophilicity on the surface.

Specific examples of the material which constitutes the hydrophilic coating layer 20 include silicic acid-based components, silane-based components, siloxane-based components, silica-based components, acrylic-based components, elastomer-based components, phenol-based components, urea-based components, urethane-based components, melamine-based components, and cellulose-based components, among which the siloxane-based components, silica-based components, and acrylic-based components may be preferred from the viewpoint that desired wettability can be readily achieved. One type of the above-described materials may be used alone, or two or more types may also be used in combination.

Examples of the above functional groups having hydrophilicity include a hydroxyl group, silanol group, carboxyl group, amino group, thiol group, aldehyde group, and quaternary ammonium group. When the material which constitutes the hydrophilic coating layer 20 includes such functional groups, hydrogen bonding may readily occur between the functional groups and the water molecules. This can enhance the affinity between the surface of the hydrophilic coating layer 20 and water, and desired wettability may be readily achieved.

Examples of the above acrylic-based components include an active energy ray-curable (meth)acrylic ester polymer into which a hydrophilic group is introduced, a thermosetting (meth)acrylic ester polymer into which a hydrophilic group is introduced, and a reactive functional group monomer having a hydrophilic group. One type of these materials may be used alone, or two or more types may also be used in combination. Among these, the active energy ray-curable (meth)acrylic ester polymer into which a hydrophilic group is introduced may be preferably used, and a composition that contains the material may be particularly preferably used, from the viewpoint that desired wettability may be readily achieved. As used in the present description, the (meth)acrylic ester refers to both an acrylic ester and a methacrylic ester. The same applies to other similar terms.

The previously-described functional groups having hydrophilicity can be used as a hydrophilic group in the active energy ray-curable (meth)acrylic ester polymer into which the hydrophilic group is introduced. In particular, a quaternary ammonium group, hydroxyl group, carboxyl group, aldehyde group, etc. may be preferred, among which the quaternary ammonium group may be preferred. Examples of the quaternary ammonium group include a trialkylammonium group such as a trimethylammonium group, triethylammonium group, and tributylammonium group. Examples of the counter ion to the nitrogen atom which constitutes the quaternary ammonium group include a chloride ion, bromide ion, and hydroxide ion.

In the active energy ray-curable (meth)acrylic ester polymer into which a hydrophilic group is introduced, a functional group having active energy ray curability may be preferably introduced into a side chain thereby to allow the polymer to exhibit the active energy ray curability. Examples of such functional groups include a carbon-carbon double bond.

Commercially available products may be used as the active energy ray-curable (meth)acrylic ester polymer into which a hydrophilic group is introduced. Examples of such products include product name "ACRIT 8WX-030" available from Taisei Fine Chemical Co., Ltd., product name "ACRIT 8WX-018" available from Taisei Fine Chemical Co., Ltd., product name "NOSTRA H2" available from Mitsui Chemicals, Inc., product name "NOSTRA SA" available from Mitsui Chemicals, Inc., and product name "NOSTRA SA3" available from Mitsui Chemicals, Inc. Among these, the product name "ACRIT 8WX-030" available from Taisei Fine Chemical Co., Ltd. may be preferably used.

When using, as the acrylic-based component, a composition that contains the active energy ray-curable (meth)acrylic ester polymer into which a hydrophilic group is introduced, the composition may preferably further contain an active energy ray-curable compound from the viewpoint of more effectively curing the polymer. Examples of the active energy ray-curable compound include, but are not limited to, polyfunctional (meth)acrylate, urethane (meth)acrylate, and polyester (meth)acrylate, among which the polyfunctional (meth)acrylate may be preferred.

Examples of the polyfunctional (meth)acrylate include dipentaerythritol hexa(meth)acrylate, ethyleneglycol di(meth)acrylate, propyleneglycol di(meth)acrylate, butyleneglycol di(meth)acrylate, neopentylglycol di(meth)acrylate, hexanediol di(meth)acrylate, trimethylolethane tri(meth)acrylate, trimethylolpropane tri(meth)acrylate, pentaerythritol tri(meth)acrylate, pentaerythritol tetra(meth)acrylate, dipentaerythritol penta(meth)acrylate, glycerol tri(meth)acrylate, and triallyl (meth)acrylate. Among the above, the dipentaerythritol hexa(meth)acrylate may be preferably used.

When using, as the acrylic-based component, a composition that contains the active energy ray-curable (meth)acrylic ester polymer into which a hydrophilic group is introduced, the composition may preferably further contain a photopolymerization initiator from the viewpoint of more effectively curing the polymer.

Examples of the photopolymerization initiator include, but are not limited to, α-ketol-based compounds such as 4-(2-hydroxyethoxy)phenyl(2-hydroxy-2-propyl)ketone, α-hydroxy-α,α'-dimethylacetophenone, 2-methyl-2-hydroxypropiophenone, and 1-hydroxycyclohexyl phenyl ketone; acetophenone-based compounds such as methoxyacetophenone, 2,2-dimethoxy-2-phenylacetophenone, 2,2-diethoxyacetophenone, and 2-methyl-1-[4-(methylthio)-phenyl]-2-morpholinopropane-1; benzoin ether-based compounds such as benzoin ethyl ether, benzoin isopropyl ether, and anisoin methyl ether; ketal-based compounds such as benzyl dimethyl ketal; aromatic sulfonyl chloride-based compounds such as 2-naphthalenesulfonyl chloride; photoactive oxime-based compounds such as 1-phenone-1,1-propanedione-2-(o-ethoxycarbonyl)oxime; benzophenone-based compounds such as benzophenone, benzoylbenzoic acid, and 3,3'-dimethyl-4-methoxybenzophenone; thioxanthone-based compounds such as thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, and 2,4-diisopropylthioxanthone; camphor quinone; halogenated ketone; acylphosphinoxide; acylphosphonate; oligo(2-hydroxy-2-methyl-1-phenyl-propan-1-one); and oligo[2-hydroxy-2-methyl-1-(4-(1-methylvinyl)phenyl)propanone]. Among these, the oligo(2-hydroxy-2-methyl-1-phenyl-propane-1-one) may be preferably used.

Examples of the above siloxane-based component include polysiloxane having a skeleton represented by the following formula (1).

$$R_3SiO-(R_2SiO)n-SiR_3 \quad (1)$$

In the above formula (1), each R is independently the previously-described hydrophilic functional group or a hydrophobic functional group such as a hydrocarbon group (methyl group, vinyl group, alkyl group, allyl group, etc). Note, however, that a certain number of R in the formula (1) are hydrophilic functional groups so that the polysiloxane having the skeleton of the formula (1) has desired hydrophilicity. In the above formula (1), n is a positive integer.

If desired, the above siloxane-based component may contain various commonly-used additives, such as a refractive index adjuster, antistatic, tackifier, silane coupling agent, antioxidant, ultraviolet absorber, light stabilizer, softening agent, filler, light curing agent, and photopolymerization initiator.

Commercially available products may be used as the above siloxane-based component. For example, it may be preferred to use product name "COLCOAT N-103X" available from COLCOAT CO., LTD., product name "COLCOAT PS-162R" available from COLCOAT CO., LTD., product name "COLCOAT PS-169" available from COLCOAT CO., LTD., or product name "COLCOAT PX" available from COLCOAT CO., LTD.

Preferred examples of the above silica-based component include those in which the previously-described hydrophilic functional group exists on the surface of the crystal represented by the composition formula $SiO_2$. In particular, a sufficient amount of the hydrophilic functional groups may preferably exist on the above surface so as to exert desired hydrophilicity.

If desired, the above silica-based component may contain various commonly-used additives, such as a refractive index adjuster, antistatic, tackifier, silane coupling agent, antioxidant, ultraviolet absorber, light stabilizer, softening agent, filler, light curing agent, and photopolymerization initiator.

Commercially available products may be used as the above silica-based component. For example, it may be preferred to use product name "Selface coat Pura PT3" available from MARUSYO SANGYO CO., LTD., "Selface coat WG-R1" available from MARUSYO SANGYO CO., LTD., or "Selface coat Pura T-type" available from MARUSYO SANGYO CO., LTD.

The thickness of the hydrophilic coating layer 20 may be preferably 1 nm or more, more preferably 10 nm or more, particularly preferably 50 nm or more, and further preferably 100 nm or more. From another aspect, the thickness may be preferably 5,000 nm or less, particularly preferably 1,550 nm or less, and further preferably 550 nm or less. When the thickness of the hydrophilic coating layer 20 is 1 nm or more, the hydrophilic coating layer 20 can readily exhibit good wettability with a specimen, and the specimen can be more easily stored in the grooves 3 of the obtained testing member 100. When the thickness of the hydrophilic coating layer 20 is 5,000 nm or less, the hydrophilic coating layer 20 can readily have excellent transparency to the testing light, and good test can be easily performed using the obtained testing member 100.

(3) Adhesive Layer

In the cover film for testing 1 according to the present embodiment, a material that constitutes the adhesive layer 30 is not particularly limited, provided that the material can well fix the cover film for testing 1 to the substrate 2 and does not adversely affect the test. Examples of the material include a pressure sensitive adhesive, thermoplastic resin, adhesive, and self-adhesive agent. One type of these materials may be used alone, or two or more types may also be used in combination.

(3-1) Pressure Sensitive Adhesive

Specific examples of the above pressure sensitive adhesive include an acrylic-based pressure sensitive adhesive, silicone-based pressure sensitive adhesive, rubber-based pressure sensitive adhesive, urethane-based pressure sensitive adhesive, polyester-based pressure sensitive adhesive, and polyvinyl ether-based pressure sensitive adhesive, among which the acrylic-based pressure sensitive adhesive, silicone-based pressure sensitive adhesive, or rubber-based pressure sensitive adhesive may be preferred and the acrylic-based pressure sensitive adhesive may be particularly preferred from the viewpoint of exhibiting good interfacial adhesion and from the viewpoint that the pressure sensitive adhesive is less likely to adversely affect the test using the testing member 100. The pressure sensitive adhesive which constitutes the adhesive layer 30 may be active energy ray-curable or non-active energy ray-curable.

The acrylic-based pressure sensitive adhesive is not particularly limited, but may preferably be a non-active energy ray-curable acrylic-based pressure sensitive adhesive produced from a pressure sensitive adhesive composition P that contains a (meth)acrylic ester polymer (A) and a crosslinker (B).

The (meth)acrylic ester polymer (A) may preferably contain a (meth)acrylic alkyl ester of which the carbon number of alkyl group is 1 to 20, as the monomer which constitutes the polymer. This allows the obtained pressure sensitive adhesive to exhibit a preferred pressure sensitive adhesive property. The (meth)acrylic ester polymer (A) may preferably contain a monomer having a reactive functional group (reactive functional group-containing monomer) as the monomer which constitutes the polymer. This allows the (meth)acrylic ester polymer (A) to react with the crosslinker (B) to form a crosslinked structure. The (meth)acrylic ester polymer (A) may further contain other monomers as those which constitute the polymer.

Examples of the (meth)acrylic alkyl ester of which the carbon number of alkyl group is 1 to 20 include methyl (meth)acrylate, ethyl (meth)acrylate, propyl (meth)acrylate, n-butyl (meth)acrylate, n-pentyl (meth)acrylate, n-hexyl (meth)acrylate, 2-ethylhexyl (meth)acrylate, isooctyl (meth)acrylate, n-decyl (meth)acrylate, n-dodecyl (meth)acrylate, myristyl (meth)acrylate, palmityl (meth)acrylate, and stearyl (meth)acrylate. Among these, (meth)acrylic alkyl ester of which the carbon number of alkyl group is 1 to 8 may be preferred from the viewpoint of further improving the pressure sensitive adhesive property, and the n-butyl (meth)acrylate and 2-ethylhexyl (meth)acrylate may be particularly preferred. These may each be used alone, or two or more types may also be used in combination.

The (meth)acrylic ester polymer (A) may preferably contain 10 mass % or more, particularly preferably contain 15 mass % or more, and further preferably contain 20 mass % or more of the (meth)acrylic alkyl ester of which the carbon number of alkyl group is 1 to 20, as the monomer unit which constitutes the polymer. From another aspect, the (meth)acrylic ester polymer (A) may preferably contain 99 mass % or less, particularly preferably contain 98 mass % or less, and further preferably contain 97 mass % or less of the (meth)acrylic alkyl ester of which the carbon number of alkyl group is 1 to 20, as the monomer unit which constitutes the polymer.

Preferred examples of the above reactive functional group-containing monomer include a monomer having a hydroxyl group in the molecule (hydroxyl group-containing monomer), a monomer having a carboxyl group in the molecule (carboxyl group-containing monomer), and a monomer having an amino group in the molecule (amino group-containing monomer. One type of these reactive functional group-containing monomers may be used alone, or two or more types may also be used in combination.

Examples of the hydroxyl group-containing monomer include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)

acrylate. Among these, the 2-hydroxyethyl (meth)acrylate may be preferred from the viewpoint of the reactivity of hydroxyl groups with the crosslinker (B) in the (meth) acrylic ester polymer (A) to be obtained and the copolymerizability with other monomers, 2-hydroxyethyl (meth)acrylate Is preferable. These may each be used alone, or two or more types may also be used in combination.

Examples of the carboxyl group-containing monomer include ethylenically unsaturated carboxylic acids such as acrylic acid, methacrylic acid, crotonic acid, maleic acid, itaconic acid, and citraconic acid. These may each be used alone, or two or more types may also be used in combination.

Examples of the amino group-containing monomer include aminoethyl (meth)acrylate and n-butylaminoethyl (meth)acrylate. These may each be used alone, or two or more types may also be used in combination.

The (meth)acrylic ester polymer (A) may preferably contain 1 mass % or more, particularly preferably contain 2 mass % or more, and further preferably contain 3 mass % or more of the reactive group-containing monomer, as the monomer unit which constitutes the polymer. From another aspect, the (meth)acrylic ester polymer (A) may preferably contain 30 mass % or less, more preferably contain 20 mass % or less, particularly preferably contain 10 mass % or less, and further preferably contain 7 mass % or less of the reactive group-containing monomer, as the monomer unit which constitutes the polymer.

Examples of the above other monomers include alkoxyalkyl (meth)acrylates such as methoxyethyl (meth)acrylate and ethoxyethyl (meth)acrylate; (meth)acrylates having aliphatic rings, such as cyclohexyl (meth)acrylate; non-crosslinkable acrylamides such as acrylamide and methacrylamide; (meth)acrylates having non-crosslinkable tertiary amino groups, such as N,N-dimethylaminoethyl (meth)acrylate and N,N-dimethylaminopropyl (meth)acrylate; vinyl acetate; and styrene. These may each be used alone, or two or more types may also be used in combination.

The polymerization form of the (meth)acrylic ester polymer (A) may be a random copolymer or may also be a block copolymer.

The weight-average molecular weight of the (meth) acrylic ester polymer (A) may be preferably 50,000 or more, particularly preferably 100,000 or more, and further preferably 150,000 or more. From another aspect, the weight-average molecular weight may be preferably 1,000,000 or less, particularly preferably 600,000 or less, and further preferably 300,000 or less. As used in the present description, the weight-average molecular weight refers to a polystyrene equivalent value that is measured using a gel permeation chromatography (GPC) method.

One type of the (meth)acrylic ester polymer (A) may be used alone, or two or more types may also be used in combination.

It suffices that the above crosslinker (B) is reactive with a reactive functional group of the (meth)acrylic ester polymer (A). Examples of the crosslinker (B) include an isocyanate-based crosslinker, epoxy-based crosslinker, amine-based crosslinker, melamine-based crosslinker, aziridine-based crosslinker, hydrazine-based crosslinker, aldehyde-based crosslinker, oxazoline-based crosslinker, metal alkoxide-based crosslinker, metal chelate-based crosslinker, metal salt-based crosslinker, and ammonium salt-based crosslinker. When the (meth)acrylic ester polymer (A) contains a hydroxyl group as the reactive functional group, it is preferred to use the isocyanate-based crosslinker among the above crosslinkers because of excellent reactivity with hydroxyl groups. One type of the crosslinker (B) may be used alone, or two or more types may also be used in combination.

The isocyanate-based crosslinker contains at least a polyisocyanate compound. Examples of the polyisocyanate compound include aromatic polyisocyanates such as tolylene diisocyanate, diphenylmethane diisocyanate, and xylylene diisocyanate; aliphatic polyisocyanates such as hexamethylene diisocyanate; alicyclic polyisocyanates such as isophorone diisocyanate and hydrogenated diphenylmethane diisocyanate; biuret bodies and isocyanurate bodies thereof; and adduct bodies that are reaction products with low molecular active hydrogen-containing compounds such as ethylene glycol, propylene glycol, neopentyl glycol, trimethylol propane, and castor oil. Among these, the hexamethylene diisocyanate may be preferred from the viewpoint of reactivity with hydroxyl groups.

The content of the crosslinker (B) in the pressure sensitive adhesive composition P may be preferably 0.1 mass parts or more, more preferably 1 mass part or more, particularly preferable 2 mass parts or more, and further preferably 3 mass parts or more with respect to 100 mass parts of the (meth)acrylic ester polymer (A). From another aspect, the content may be preferably 20 mass parts or less, particularly preferable 15 mass parts or less, and further preferably 10 mass parts or less with respect to 100 mass parts of the (meth)acrylic ester polymer (A).

The pressure sensitive adhesive composition P can be manufactured by mixing the (meth)acrylic ester polymer (A) and the crosslinker (B). For example, the pressure sensitive adhesive composition P can be manufactured through preliminarily preparing the (meth)acrylic ester polymer (A) and adding the crosslinker (B) and, if desired, other additives.

The (meth)acrylic ester polymer (A) can be manufactured by polymerizing a mixture of monomer units that constitute the polymer using an ordinary radical polymerization method. Polymerization of the (meth)acrylic ester polymer (A) can be performed by a solution polymerization method or the like using a polymerization initiator, if desired. Examples of the polymerization solvent include ethyl acetate, n-butyl acetate, isobutyl acetate, toluene, acetone, hexane, and methyl ethyl ketone, and two or more types may also be used in combination.

When mixing the (meth)acrylic ester polymer (A) and the crosslinker (B), they may be mixed in a diluting solvent so that a coating liquid of the pressure sensitive adhesive composition P can be prepared. Examples to be used as the diluting solvent include aliphatic hydrocarbons such as hexane, heptane, and cyclohexane; aromatic hydrocarbons such as toluene and xylene; halogenated hydrocarbons such as methylene chloride and ethylene chloride; alcohols such as methanol, ethanol, propanol, butanol, and 1-methoxy-2-propanol; ketones such as acetone, methyl ethyl ketone, 2-pentanone, isophorone, and cyclohexanone; esters such as ethyl acetate and butyl acetate; cellosolve-based solvents such as ethyl cellosolve, among which the methyl ethyl ketone may be preferably used.

The concentration and viscosity of the coating liquid thus prepared are not particularly limited, provided that they are within certain ranges that allow coating, and can be appropriately selected in accordance with the situation.

Although not particularly restricted, the silicone-based pressure sensitive adhesive may preferably contain an organopolysiloxane, in particular, an addition-type organopolysiloxane (a cured product thereof). The addition-type organopolysiloxane may preferably be obtained through a reaction between an organohydrogenpolysiloxane and an organopolysiloxane of which the main skeleton is a siloxane bond and which has an alkenyl group.

The organopolysiloxane of which the main skeleton is a siloxane bond and which has an alkenyl group may preferably be a compound that is represented by the following average unit formula (2) and has at least two alkenyl groups in the molecule.

$$R^1{}_a SiO_{(4-a)/2} \quad (2)$$

(In the formula, each $R^1$ is independently the same or different unsubstituted or substituted monovalent hydrocarbon group of which the carbon number is 1 to 12 and preferably 1 to 8, and "a" is a positive number of 1.5 to 2.8, preferably 1.8 to 2.5, and more preferably 1.95 to 2.05.)

Examples of the above unsubstituted or substituted monovalent hydrocarbon group represented by $R^1$ bonded to the silicon atom include alkenyl groups such as a vinyl group, allyl group, propenyl group, isopropenyl group, butenyl group, hexenyl group, cyclohexenyl group, and octenyl group; alkyl groups such as a methyl group, ethyl group, propyl group, isopropyl group, butyl group, isobutyl group, tert-butyl group, pentyl group, neopentyl group, hexyl group, cyclohexyl group, octyl group, nonyl group, and decyl group; aryl groups such as a phenyl group, tolyl group, xylyl group, and naphthyl group; aralkyl groups such as a benzyl group, phenethyl group, and phenylpropyl group; and those obtained by substituting a part or all of the hydrogen atoms of these groups with halogen atoms such as fluorine, bromine and chlorine, cyano groups, or other appropriate groups, for example, a chloromethyl group, chloropropyl group, bromoethyl group, trifluoropropyl group, cyanoethyl group, and the like. The alkenyl group may preferably be a vinyl group from the viewpoint of reducing the curing time and increasing the productivity.

The organohydrogenpolysiloxane has a SiH group in the molecule. The above alkenyl group of the organopolysiloxane and the SiH group of the organohydrogenpolysiloxane react with each other through an addition reaction and an addition-type organopolysiloxane can thereby be obtained.

The addition-type organopolysiloxane is well cured in the presence of a platinum catalyst and, therefore, the above silicone-based pressure sensitive adhesive may preferably contain a platinum catalyst. Examples of the platinum catalyst include platinum black, platinum chloride, chloroplatinic acid, a reaction product of chloroplatinic acid and monohydric alcohol, a complex of chloroplatinic acid and olefins, and platinum bisacetoacetate.

The addition-type organopolysiloxane can contain an organopolysiloxane (silicone resin) that contains a trifunctional or tetrafunctional siloxane unit in the molecule in order to increase the pressure sensitive adhesive strength.

If desired, the above silicone-based pressure sensitive adhesive may contain various commonly-used additives, such as a refractive index adjuster, antistatic, tackifier, silane coupling agent, antioxidant, ultraviolet absorber, light stabilizer, softening agent, filler, light curing agent, and photopolymerization initiator.

(3-2) Thermoplastic Resin

The above thermoplastic resin is not particularly limited, provided that the thermoplastic resin can well fix the cover film for testing 1 and the substrate 2 by thermal fusion bonding and does not adversely affect the test.

Specific examples of the above thermoplastic resin include a polyester-based resin, polyolefin-based resin, polyurethane-based resin, polyester urethane-based resin, acrylic-based resin, amide-based resin, styrene-based resin, silane-based resin, and rubber-based resin. The polyolefin-based resin may be modified. Examples of the modified polyolefin-based resin include an acid-modified polyolefin-based resin and silane-modified polyolefin-based resin. On type of them may be used alone, or a mixture of two or more types may also be used.

The above polyester-based resin may be a hydrophobic polyester-based resin that is soluble in an organic solvent or may also be a hydrophilic polyester-based resin that is soluble in water or a water-soluble organic solvent. From the viewpoint of adhesion property of the adhesive layer 30 to the hydrophilic coating layer 20 and the substrate 2, the polyester-based resin may preferably be a hydrophilic polyester-based resin. Specific examples of the above polyester-based resin include polymers obtained by condensation polymerization between at least one selected from alcohol components such as ethylene glycol, propylene glycol, 1,3-butanediol, 1,4-butanediol, diethylene glycol, triethylene glycol, 1,5-pentanediol, 1,6-hexanediol, neopentyl glycol, cyclohexane-1,4-dimethanol, hydrogenated bisphenol A, and ethylene oxide or propylene oxide adduct of bisphenol A and at least one selected from carboxylic acid components such as terephthalic acid, isophthalic acid, naphthalene dicarboxylic acid, cyclohexane-1,4-dicarboxylic acid, adipic acid, azelaic acid, maleic acid, fumaric acid, and itaconic acid and an acid anhydride thereof. Among these, those corresponding to the hydrophilic polyester-based resin may preferably be used.

Examples of the polyolefin-based resin (unmodified polyolefin-based resin) include polyethylene resins, such as very low density polyethylene (VLDPE, density: 880 kg/m$^3$ or more and less than 910 kg/m$^3$), low density polyethylene (LDPE, density: 910 kg/m$^3$ or more and less than 915 kg/m$^3$), middle density polyethylene (MDPE, density: 915 kg/m$^3$ or more and less than 942 kg/m$^3$), and high density polyethylene (HDPE, density: 942 kg/m$^3$ or more), polypropylene resin (PP), ethylene-propylene copolymer, olefin-based elastomer (TPO), ethylene-vinyl acetate copolymer (EVA), ethylene-vinyl acetate-maleic anhydride copolymer, ethylene-(meth)acrylic acid copolymer, ethylene-(meth) acrylic ester copolymer, and ethylene-(meth)acrylic ester-maleic anhydride copolymer. As used in the present description, the ethylene-(meth)acrylic acid copolymer refers to both an ethylene-acrylic acid copolymer and an ethylene-methacrylic acid copolymer. The same applies to other similar terms.

The thermoplastic resin may also be an ionomer in which molecules are bonded by metal cations. Examples of the ionomer include an olefin-based ionomer, urethane-based ionomer, styrene-based ionomer, and fluorine-based ionomer. One type of ionomer may be used alone, or a mixture of two or more types may also be used.

Among the above specific examples of the thermoplastic resin, the polyolefin-based resin, polyester-based resin, or acrylic-based resin may be preferred and the polyester-based resin may be particularly preferred from the viewpoint of exhibiting good adhesion property and from the viewpoint that the thermoplastic resin is less likely to adversely affect the test using the testing member 100.

The glass-transition temperature (Tg) of the thermoplastic resin which constitutes the adhesive layer 30 may be preferably 35° C. or higher, particularly preferably 40° C. or higher, and further preferably 45° C. or higher. From another aspect, the glass-transition temperature (Tg) may be preferably 150° C. or lower, particularly preferably 145° C. or lower, and further preferably 140° C. or lower. When the above glass-transition temperature (Tg) is 35° C. or higher, the adhesive layer 30 does not readily melt even if the testing member 100 is heated during the test. It is therefore possible to effectively suppress the occurrence of delamination and/or displacement at the interface between the adhesive layer 30 and the hydrophilic coating layer 20 or the substrate 2. When the above glass-transition temperature (Tg) is 150° C. or lower, excessive heating is not necessary for the production of the testing member 100 during the fixation of the cover film for testing 1 and the substrate 2 by thermal fusion bonding of the adhesive layer 30. It is therefore possible to prevent the deformation of other members and reduce the production cost.

(3-3) Thickness of Adhesive Layer

The thickness of the adhesive layer 30 may be preferably 0.5 μm or more, particularly preferably 1 μm or more, and further preferably 1.5 μm or more. From another aspect, the thickness may be preferably 15 μm or less, particularly preferably 5 μm or less, and further preferably 2 μm or less. When the thickness of the adhesive layer 30 is 0.5 μm or more, the cover film for testing 1 can be better fixed to the substrate 2. When the thickness of the adhesive layer 30 is 15 μm or less, the influence of the thickness of the adhesive layer 30 on the test can be reduced, and good test can be easily performed using the obtained testing member 100.

(4) Release Sheet

In the cover film for testing 1 according to the present embodiment, to protect the adhesive layer 30 until the cover film for testing 1 is laminated on the substrate 2, a release sheet may be laminated on the surface of the adhesive layer 30 opposite to the base material 10. In particular, when the adhesive layer 30 is composed of a pressure sensitive adhesive, it may be preferred to laminate a release sheet. The shape in the plan view of the release sheet may preferably be the same as the shape in the plan view of the base material 10, but may also be the same as the shape in the plan view of the adhesive layer 30.

Examples to be used as the release sheet include a polyethylene film, polypropylene film, polybutene film, polybutadiene film, polymethylpentene film, polyvinyl chloride film, vinyl chloride copolymer film, polyethylene terephthalate film, polyethylene naphthalate film, polybutylene terephthalate film, polyurethane film, ethylene vinyl acetate film, ionomer resin film, ethylene-(meth)acrylic acid copolymer film, ethylene-(meth)acrylic ester copolymer film, polystyrene film, polycarbonate film, polyimide film, fluorine resin film, and liquid crystal polymer film. Crosslinked films thereof may also be used. Laminated films thereof may also be used.

The release surface (surface to be in contact with the adhesive layer 30) of the release sheet may preferably be subjected to release treatment. Examples of the release agent used in the release treatment include alkyd-based, silicone-based, fluorine-based, unsaturated polyester-based, polyolefin-based, and wax-based release agents.

The thickness of the release sheet is not particularly limited, but may ordinarily be 20 μm or more and 150 μm or less.

2. Physical Properties Etc. Of Cover Film for Testing

In the cover film for testing 1 according to the present embodiment, the water contact angle on the surface of the hydrophilic coating layer exposed part 40 may be preferably 60° or less, more preferably 50° or less, particularly preferably 25° or less, and further preferably 10° or less. When the water contact angle is 60° or less, the specimen is more easily compatible with the surface of the hydrophilic coating layer 20, and the specimen can better wet the surface and spread on the surface. This promotes the capillary phenomenon in the testing member 100, and the specimen readily develops throughout the grooves 3. As a result, it is possible to more easily store the specimen in the grooves 3. The lower limit of the above water contact angle is not particularly limited, but may be ordinarily 0° or more, preferably 1° or more, particularly preferably 4° or more, and further preferably 7° or more.

In the cover film for testing 1 according to the present embodiment, the arithmetic average roughness (Ra) on the surface of the hydrophilic coating layer exposed part 40 may be preferably 200 nm or less, particularly preferably 100 nm or less, and further preferably 50 nm or less. When the above arithmetic average roughness (Ra) is 200 nm or less, diffuse reflection of the testing light can be suppressed on the surface of the hydrophilic coating layer exposed part 40, and the cover film for testing 1 may readily have transparency to the testing light. This allows the obtained testing member 100 to have improved accuracy in the test. The lower limit of the arithmetic average roughness (Ra) is not particularly limited, but in general may be preferably 0.1 nm or more, particularly preferably 0.5 nm or more, and further preferably 1 nm or more.

In the cover film for testing 1 according to the present embodiment, the arithmetic average roughness (Ra) on the surface of the base material 10 opposite to the adhesive layer 30 may be preferably 200 nm or less, particularly preferably 100 nm or less, and further preferably 50 nm or less. When the arithmetic average roughness (Ra) is 200 nm or less, diffuse reflection of the testing light can be suppressed on the surface of the cover film for testing 1 at the base material 10 side when the testing member 100 is assembled, and the cover film for testing 1 may readily have excellent transparency to the testing light. As a result, the obtained testing member 100 can have improved accuracy in the test. The lower limit of the above arithmetic average roughness (Ra) is not particularly limited, but in general may be preferably 0.1 nm or more, particularly preferably 0.5 nm or more, and further preferably 1 nm or more.

The above arithmetic average roughness (Ra) on the surface of the hydrophilic coating layer exposed part 40 and the above arithmetic average roughness (Ra) on the surface of the base material 10 opposite to the adhesive layer 30 may be measured using a surface roughness meter (product name "SV-3000S4" available from Mitutoyo Corporation, stylus type) in accordance with JIS B0601: 2013.

In the cover film for testing 1 according to the present embodiment, when the hydrophilic coating layer exposed part 40 is provided in a line-like shape in the plan view, the width of the hydrophilic coating layer exposed part 40 (width of the line) may be preferably 20 mm or less, particularly preferably 15 mm or less, and further preferably 10 mm or less. When the width is 20 mm or less, the capillary phenomenon is effectively promoted as the specimen develops throughout the grooves 3, and the specimen can be better stored in the grooves 3. The lower limit of the above width may be preferably equal to or more than the width of the grooves 3 of the substrate 2 from the viewpoints of suppressing the material of the adhesive layer 20 from invading into the grooves 3 of the substrate 2 and allowing the specimen to come into good contact with the surface of the hydrophilic coating layer exposed part 40. Specifically, the lower limit may be preferably 0.5 mm or more, particularly preferably 0.75 mm or more, and further preferably 1 mm or more.

3. Method of Manufacturing Cover Film for Testing

The cover film for testing 1 according to the present embodiment may be preferably manufactured by a method of manufacturing that includes a step of forming the hydrophilic coating layer 20 on a surface of the base material 10 (this step may be referred to as a "first step," hereinafter) and a step of partially forming the adhesive layer 30 on a surface of the hydrophilic coating layer 20 opposite to the base material 10 (this step may be referred to as a "second step," hereinafter.

In the above first step, for example, the hydrophilic coating layer 20 can be formed through diluting the material, which is to constitute the hydrophilic coating layer 20, with a solvent to prepare a coating liquid, coating a surface of the base material 10 with the coating liquid, then drying the obtained coating film and, if desired, irradiating the coating film with active energy rays.

The above solvent is not particularly limited. For example, propylene glycol monomethyl ether, toluene, ethyl acetate, methyl ethyl ketone, etc. can be used, and it may be particularly preferred to use the propylene glycol monomethyl ether.

The method of coating with the above coating liquid is not particularly limited. For example, a Meyer bar method, bar-coating method, knife-coating method, roll-coating method, blade-coating method, die-coating method, gravure-coating method, etc. can be used, and it may be particularly preferred to use the Meyer bar method.

The temperature of the above drying may be preferably 60° C. or higher and particularly preferably 70° C. or higher. From another aspect, the temperature may be preferably 150° C. or lower and particularly preferably 135° C. or lower. The time of drying may be preferably 5 seconds or more, particularly preferably 15 seconds or more, and further preferably 30 seconds or more. From another aspect, the time may be preferably 120 seconds or less, particularly preferably 100 seconds or less, and further preferably 80 seconds or less.

Irradiation with active energy rays may be preferably performed when using the previously-described active energy ray-curable (meth)acrylic ester polymer into which a hydrophilic group is introduced, as a material that constitutes the hydrophilic coating layer 20. As the above active energy rays, for example, electromagnetic wave or charged particle radiation having an energy quantum can be used and, specifically, ultraviolet rays, electron rays or the like can be used. In particular, ultraviolet rays may be preferred because of easy management. Irradiation with ultraviolet rays can be performed using a high pressure mercury lamp, xenon lamp or the like, and the irradiance level of ultraviolet rays may be preferably 50 mW/cm$^2$ or more and 1,000 mW/cm$^2$ or less as the illuminance. The accumulated light amount may be preferably 50 mJ/cm$^2$ or more, particularly preferably 80 mJ/cm$^2$ or more, and further preferably 100 mJ/cm$^2$ or more. From another aspect the accumulated light amount may be preferably 10,000 mJ/cm$^2$ or less, particularly preferably 5,000 mJ/cm$^2$ or less, and further preferably 2,000 mJ/cm$^2$ or less. On the other hand, irradiation with electron rays can be performed using an electron ray accelerator or the like, and the irradiance level of electron rays may be preferably 10 krad or more and 1,000 krad or less.

In the above second step, for example, the adhesive layer 30 may be preferably formed through diluting the material, which is to constitute the adhesive layer 30, with a solvent to prepare a coating liquid, partially coating a surface of the hydrophilic coating layer 20 opposite to the base material 10 with the coating liquid (including the concept of printing), and then drying the obtained coating film. In this operation, the region of the surface of the hydrophilic coating layer 20 to be the hydrophilic coating layer exposed part 40 (region corresponding to the grooves 3 of the substrate 2) is not coated with the above coating liquid, so that the hydrophilic coating layer exposed part 40 is formed. The above solvent and the method of coating with the above coating liquid are not particularly limited, and the same solvent and method as those when forming the hydrophilic coating layer 20 can be employed.

In particular, the above second step may preferably includes printing the material, which is to constitute the adhesive layer 30, on the surface of the hydrophilic coating layer 20 opposite to the base material 10 thereby to partially form the adhesive layer 30. In this printing process, the above material is not printed on the region, in which the hydrophilic coating layer exposed part 40 is to be provided, of the surface of the hydrophilic coating layer 20 opposite to the base material 10, and the material is printed only in a region other than that region thereby to form the adhesive layer 30 together with the hydrophilic coating layer exposed part 40 having a predetermined shape. According to this method, the hydrophilic coating layer exposed part 40 can be easily and accurately formed, and this method is excellent in the cost benefit and suitable for large-lot production. Moreover, the formation of the adhesive layer 30 by printing is easy to control the thickness of the adhesive layer 30, and the cover film for testing 1 can therefore be manufactured with the adhesive layer 30 having a desired thickness.

A commonly-used method can be used as the method of printing the material which is to constitute the adhesive layer 30. For example, screen printing, gravure printing, offset printing, ink jet printing, etc. can be used. Among the above-described printing methods, the screen printing may be preferred from the viewpoint that the hydrophilic coating layer 20 having a predetermined shape can be formed accurately.

When printing the material which is to constitute the adhesive layer 30, the material may be diluted with a solvent as necessary to form a coating liquid (ink), and the coating liquid may be printed. The solvent can be selected in accordance with the type of the material. For example, it may be preferred to use methyl ethyl ketone, toluene, ethyl acetate, and the like. In particular, methyl ethyl ketone may be preferably used.

<Testing Member>

FIG. 2 illustrates a cross-sectional view of the testing member 100 according to the present embodiment. The testing member 100 comprises a substrate 2 having a surface provided with at least one or more grooves 3 and the cover film for testing 1 according to the present embodiment laminated on the surface of the substrate 2 provided with the grooves 3. In the testing member 100, the location of the hydrophilic coating layer exposed part 40 in the cover film for testing 1 and the grooves 3 of the substrate 2 overlap with each other in the plan view.

The testing member 100 according to the present embodiment may be for performing an optical test for a specimen stored in the grooves 3.

In the testing member 100 according to the present embodiment, the cover film for testing 1 and the substrate 2 are well fixed to each other via the adhesive layer 30 of the cover film for testing 1. Moreover, in the testing member 100, the adhesive layer 30 does not exist in the region which overlaps with the grooves 3 in the plan view and it is thereby possible to prevent the material, which constitutes the adhesive layer 30, from invading into the grooves 3 or from filling the grooves 3. Furthermore, in the testing member 100, the cover film for testing 1 has the hydrophilic coating layer exposed part 40 at which the hydrophilic coating layer 20 is exposed, and the specimen stored in the grooves 3 can thereby come into contact with the surface of the hydrophilic coating layer exposed part 40, so that the specimen may readily be stored in the entire grooves 3. As the above, according to the testing member 100 of the present embodiment, the test can be well performed.

The shape in the plan view of the testing member 100 according to the present embodiment is not particularly restricted, but may preferably be a disk-like shape or chip-like shape. The disk-like shape refers to a precisely circular shape or its modified shape in the plan view of the testing member 100. In the case of such a disk-like shape, a hole may be provided at the center of the testing member 100. The shape of the hole may be a circular shape that is concentric in the plan view with the circumference of the testing member 100. The chip-like shape refers to a square shape, rectangular shape, or their modified shapes in the plan view of the testing member 100.

1. Configuration of Testing Member
(1) Substrate

In the testing member 100 according to the present embodiment, the substrate 2 is not particularly limited, provided that the test can be performed using the testing member 100 which includes the substrate 2. From the viewpoint of enabling a good test, it may be preferred for the substrate 2 to have transparency to the testing light.

As a material of the substrate 2, a resin, glass, and other appropriate material can be used, among which the resin may preferably be used from the viewpoint of easy production and easy handling. As the resin, resins that constitute the previously-described resin films can be used as in the base material 10. Among such resins, polycarbonate, polyethylene terephthalate, polybutylene terephthalate, cycloolefin resin, or acrylic resin may preferably be used and the polycarbonate may be particularly preferably used from the viewpoint of excellent transparency to the testing light. As previously described, the same material as that of the base material 10 may preferably be used as a material of the substrate 2 from the viewpoint of reducing the difference in the transparency to the testing light.

In the testing member 100 according to the present embodiment, the transmittance of the testing light through the substrate 2 may be preferably 60% or higher, particularly preferably 80% or higher, and further preferably 90% or higher. The above transmittance being 60% or higher allows the testing member 100 to have better transparency to the testing light and the test can be more accurately performed. The upper limit of the above transmittance is not particularly limited and may be 100% or lower.

In the testing member 100 according to the present embodiment, the haze value of the substrate 2 may be preferably 10% or less, particularly preferably 5% or less, and further preferably 1% or less. The haze value of the substrate 2 being 10% or less can effectively reduce the scattering of the testing light in the substrate 2. In the testing member 100, therefore, the test can be more accurately performed. The lower limit of the haze value of the substrate 2 is not particularly limited, but may ordinarily be 0% or more.

In the substrate 2, for the purpose of improving the interfacial adhesion with the adhesive layer 30, the surface of the substrate 2 on which the adhesive layer 30 is to be laminated can be subjected to surface treatment, such as using an oxidation method and roughening method, or primer treatment, provided that the transparency to the testing light is not impaired. Specific examples of the above oxidation method and roughening method include those which are previously described as such treatment for the base material 10. These surface treatment methods may be appropriately selected in accordance with the type of the material which constitutes the substrate 2.

One surface of the substrate 2 is provided with at least one or more groove 3. In the substrate 2 of the testing member 100 illustrated in FIG. 2, the surface of the substrate 2 at the adhesive layer 30 side is provided with a plurality of grooves 3 (three grooves 3 in FIG. 2) that each have a width w1 and a depth d1.

The cross-sectional shape of the grooves 3 is not limited, provided that the grooves 3 can store a specimen and the test can be well performed. In FIG. 2, the shape of the cross section is a triangle, but is not limited to this. In an alternative embodiment, the shape of the cross section may be a square, rectangle, semicircle, or other appropriate shape.

The shape in the plan view of the grooves 3 is also not limited, provided that the grooves 3 can store a specimen and the test can be well performed. For example, the shape may be a line-like shape, dot-like shape, or other appropriate shape. From the viewpoint that the testing light can be scanned along the grooves 3, the shape may preferably be a line-like shape. In the case of the line-like shape, the shape in the plan view of the grooves 3 may preferably be a linear shape or a curved shape. When the testing member 100 is in the previously-described disk-like shape, the groove 3 may preferably be arranged in a circular shape that is concentric in the plan view with the outer circumference of the testing member 100. In this case, scanning of the testing light for the grooves 3 can be easily performed by rotating the testing member 100 around an axis of rotation, that is, a straight line that passes through the center of the circular shape and is orthogonal to the circular shape.

Surface treatment for improving the wettability may preferably be performed for the surface of the substrate 2 at the cover film for testing 1 side, in particular, for portions of the surface that constitute the grooves 3. The testing member 100 according to the present embodiment has the hydrophilic coating layer exposed part 40 to allow the specimen to be readily stored in the entire grooves 3, as previously described. In addition to this, the above surface treatment may be performed for the substrate 2 thereby to allow the specimen to further readily develop along the grooves 3 when the specimen is stored in the grooves 3, and better storage can thus be achieved. Examples of the above surface treatment include a method of coating the objected surface with a component that improves the wettability and a method of performing surface modification. Examples of the component which improves the wettability include components for hydrophilic coating. Examples of the scheme of surface modification include corona treatment, plasma treatment, ultraviolet ray treatment, and flame treatment.

With regard to the above wettability, the surface tension on the surface of the substrate 2 at the cover film for testing 1 side may be preferably 30 mN/m or more, particularly preferably 35 mN/m or more, and further preferably 40 mN/m or more. The surface tension being 30 mN/m or more allows the specimen to readily wet the surfaces of grooves 3 and spread thereon when the specimen is stored in the grooves 3. Owing to synergistic effects of such an action and the previously-described action that the specimen can also readily wet the surface of the hydrophilic coating layer exposed part 40 and spread thereon, the specimen can be well stored and good test can be readily performed. The upper limit of the surface tension is not particularly limited, but in general may be preferably 70 mN/m or less, particularly preferably 65 mN/m or less, and further preferably 60 mN/m or less. The surface tension refers to a value that is measured by a wetting tension test in accordance with JIS K6768: 1990.

In the testing member 100 according to the present embodiment, dimensions of the grooves 3 can be set in accordance with the method of testing to be performed and the type of the specimen. For example, the width w1 of the grooves 3 may be preferably 50 nm or more, particularly preferably 100 nm or more, and further preferably 150 nm or more. From another aspect, the width w1 may be preferably 30 μm or less, particularly preferably 10 μm or less, and further preferably 1 μm or less. The depth d1 of the grooves 3 may be preferably 50 nm or more, particularly preferably 100 nm or more, and further preferably 150 nm or more. From another aspect, the depth d1 may be preferably 30 μm or less, particularly preferably 10 μm or less, and further preferably 1 μm or less. The width w1 and depth d1 of the grooves 3 being within the above ranges can sufficiently ensure the length along which the testing light transmits through the specimen, while suppressing the necessary amount of the specimen.

In the testing member 100 according to the present embodiment, the arithmetic average roughness (Ra) of the surface of the substrate 2 opposite to the surface formed with the grooves 3 may be preferably 200 nm or less, particularly preferably 100 nm or less, and further preferably 50 nm or less. The arithmetic average roughness (Ra) being 200 nm or less can suppress the diffuse reflection of the testing light at the surface of the testing member 100 at the substrate 2 side and the testing member 100 may readily have excellent transparency to the testing light to improve the accuracy in the test. The lower limit of the above arithmetic average roughness (Ra) is not particularly limited, but in general may be preferably 0.1 nm or more, particularly preferably 0.5 nm or more, and further preferably 1 nm or more. The above arithmetic average roughness (Ra) may be measured using a surface roughness meter (product name "SV-3000S4" available from Mitutoyo Corporation, stylus type) in accordance with JIS B0601: 2013.

In the testing member 100 according to the present embodiment, the thickness of the substrate 2 (the distance between the surface laminated with the adhesive layer 30 and the opposite surface) may be preferably 0.5 mm or more, particularly preferably 0.8 mm or more, and further preferably 1 mm or more. From another aspect, the thickness may be preferably 10 mm or less, particularly preferably 5 mm or less, and further preferably 3 mm or less. The thickness of the substrate 2 being 0.5 mm or more allows the substrate 2 to have sufficient strength and it is possible to effectively suppress the deformation of the testing member 100 when it stores the specimen and is used for the test. The thickness of the substrate 2 being 10 mm or less allows the testing light to readily arrive at the specimen during the test and the test may be accurately performed.

(2) Others

The testing member 100 according to the present embodiment may be provided with an opening part for storing the specimen in the grooves 3. The opening part may be provided at least at one of the cover film for testing 1 and the substrate 2, but in particular may preferably be provided at the cover film for testing 1. With regard to the shape and size of the opening part, the opening part may preferably be formed in a shape that is suitable for a storing means used for storing the specimen in the grooves 3. A syringe, pipette, or other appropriate instrument may be used as the storing means. When a syringe is used, for example, the opening part may preferably have a shape and size that allow the tip of an injection needle of the syringe to reach the grooves 3. As will be understood, when the testing member 100 according to the present embodiment is provided with the above opening part, it is preferred to provide an air-bleeding hole.

2. Method of Manufacturing Testing Member

The testing member 100 according to the present embodiment may preferably be manufactured by attaching the surface of the previously-described cover film for testing at the adhesive layer 30 side (when the previously-described release sheet is laminated, the surface of the adhesive layer 30 which is exposed by removing the release sheet) and the surface of the substrate 2 at the side formed with the grooves 3 to each other. This attachment may be performed such that the grooves 3 of the substrate 2 are included in the plan view in the hydrophilic coating layer exposed part 40 of the cover film for testing 1.

When the adhesive layer 30 is composed of the previously-described pressure sensitive adhesive, the testing member 100 can be manufactured by attaching the cover film for testing 1 and the substrate 2 to each other under an ordinary temperature. The method of attachment can be carried out by lamination, pressure bonding, or the like.

Conditions of the above lamination are not particularly limited, provided that the cover film for testing 1 and the substrate 2 can be well fixed to each other. For example, the lamination may preferably be performed using rollers under an ordinary temperature (e.g. room-temperature environment of 25° C.). The pressure for lamination may be preferably 0.1 MPa or more and particularly preferably 0.5 MPa or more. From another aspect, the pressure may be preferably 10 MPa or less and particularly preferably 5 MPa or less. The speed of lamination may be preferably 0.1 m/min or more and particularly preferably 0.5 m/min or more. From another aspect, the speed of lamination may be preferably 5 m/min or less and particularly preferably 1 m/min or less. When the lamination is performed under such a pressure and speed, the cover film for testing 1 and the substrate 2 can be well fixed to each other.

Conditions of the above pressure bonding are not particularly limited, provided that the cover film for testing 1 and the substrate 2 can be well fixed to each other. For example, the pressure bonding may preferably be performed using a pressing machine under an ordinary temperature (e.g. room-temperature environment of 25° C.) The pressure for pressure bonding may be preferably 0.1 MPa or more and particularly preferably 0.5 MPa or more. From another aspect, the pressure may be preferably 20 MPa or less and particularly preferably 10 MPa or less. The time of pressure bonding may be preferably 10 seconds or more and particularly preferably 15 seconds or more. From another aspect, the time may be preferably 60 seconds or less and particularly preferably 30 seconds or less. When the pressure bonding is performed under such conditions, the cover film for testing 1 and the substrate 2 can be well fixed to each other in a short time.

Both the above lamination and the pressure bonding allow the attachment under a room temperature. The pressure bonding can therefore be readily performed under a temperature lower than the glass-transition temperature of the base material 10 and substrate 2. When the adhesive layer 30 is composed of the previously-described pressure sensitive adhesive, therefore, the base material 10 and the substrate 2 are less likely to deform due to heat, and the testing member 100 can be obtained with which a good test is possible.

In an embodiment, even when the adhesive layer 30 is composed of the previously-described pressure sensitive adhesive, the attachment of the cover film for testing 1 and the substrate 2 may be performed while heating them. In this case, however, it may be preferred to perform the attachment under a temperature lower than the glass-transition temperature (Tg) of each of the cover film for testing 1 and the substrate 2. This can effectively suppress the deformation of the cover film for testing 1 and substrate 2 due to heat. In particular, when the heating is performed under a temperature lower than the glass-transition temperature (Tg) of the substrate 2, deformation of the grooves 3 in the substrate 2 can be effectively suppressed, and the test using the testing member 100 can be better performed.

When the adhesive layer 30 is composed of the previously-described thermoplastic resin, the cover film for testing 1 and the substrate 2 may preferably be attached to each other by thermal fusion bonding of the thermoplastic resin. Specific scheme of the thermal fusion bonding is not limited, provided that the adhesive layer 30 in a state of being heated to melt can be laminated on the substrate 2. For example, this lamination can be performed, such as by thermal lamination and thermocompression. In particular, the thermal lamination may preferably be performed from the viewpoint of effectively suppressing the molten adhesive layer 30 from invading into the grooves 3 and effectively suppressing the deformation of the grooves 3 due to heat and also from the viewpoint of simplicity.

Conditions of the thermal lamination are not particularly limited, provided that the cover film for testing 1 and the substrate 2 can be well fixed to each other and the thermoplastic resin which constitutes the adhesive layer 30 is suppressed from invading into the grooves 3 of the substrate 2. For example, the thermal lamination can be performed using heating rollers, and the heating temperature may be preferably 60° C. or higher and particularly preferably 80° C. or higher. From another aspect, the heating temperature may be preferably 150° C. or lower and particularly preferably 120° C. or lower. The pressure for lamination may be preferably 0.1 MPa or more and particularly preferably 0.5 MPa or more. From another aspect, the pressure may be preferably 10 MPa or less and particularly preferably 5 MPa or less. The speed of lamination may be preferably 0.1 m/min or more and particularly preferably 0.5 m/min or more. From another aspect, the speed of lamination may be preferably 5 m/min or less and particularly preferably 1 m/min or less. When the thermal lamination is performed under such a heating temperature, pressure, and speed, the thermoplastic resin can be effectively suppressed from invading into the grooves 3, and the cover film for testing 1 and the substrate 2 can be well fixed to each other. In particular, the heating temperature within the above range allows the thermal lamination to be performed at a temperature that is lower than the glass-transition temperatures of the base material 10 and the substrate 2. The deformation of the base material 10 and substrate 2 due to heat can therefore be prevented and the testing member 100 can be obtained with which a good test is possible.

Conditions of the thermocompression are not particularly limited, provided that the cover film for testing 1 and the substrate 2 can be well fixed to each other and the thermoplastic resin which constitutes the adhesive layer 30 is suppressed from invading into the grooves 3 of the substrate 2. For example, the thermocompression can be performed using a thermal pressing machine, and the heating temperature may be preferably 60° C. or higher and particularly preferably 70° C. or higher. From another aspect, the heating temperature may be preferably 150° C. or lower and particularly preferably 140° C. or lower. The pressure for thermocompression may be preferably 0.1 MPa or more and particularly preferably 0.5 MPa or more. From another aspect, the pressure may be preferably 20 MPa or less and particularly preferably 10 MPa or less. The time of thermocompression may be preferably 1 minute or more and particularly preferably 5 minutes or more. From another aspect, the time of thermocompression may be preferably 20 minutes or less and particularly preferably 15 minutes or less. When the thermocompression is performed under such conditions, the thermoplastic resin can be effectively suppressed from invading into the grooves 3, and the cover film for testing 1 and the substrate 2 can be well fixed to each other. In particular, the heating temperature within the above range allows the thermocompression to be performed at a temperature lower than the glass-transition temperatures of the base material and the substrate 2. The deformation of the base material 10 and substrate 2 due to heat can therefore be prevented and the testing member 100 can be obtained with which a good test is possible.

The method of manufacturing the substrate 2 is not particularly limited. When the substrate 2 is composed of a resin, the substrate 2 may preferably be manufactured through molding the substrate 2, such as by injection molding, compression molding and insertion molding and, if necessary, performing other processing, such as surface processing.

3. Method of Using Testing Member

The testing member 100 according to the present embodiment can be used for an optical test for a specimen. Specifically, after the specimen is stored in the grooves 3 of the testing member 100, the stored specimen may be irradiated with light from outside of the testing member 100, and the light caused by the irradiation may be measured outside the testing member 100.

The specimen may preferably have flowability from the viewpoint that the specimen can readily be stored in the grooves 3. Examples of the specimen include a liquid, sol-like component, and gel-like component. In particular, the specimen may preferably be a liquid. The liquid may contain a solid component. Specific examples of the specimen include water as an object of a water quality test, cell extract, blood, cultured cell liquid, bacteria, archaebacteria, virus, protein, algae, and microbe.

The specimen can be stored in the grooves 3 through supplying the specimen into the grooves 3 via the opening part provided at the testing member 100, for example, using the previously-described storing means such as a syringe and pipette. In an embodiment, a syringe or the like provided with an injection needle may be used to operate the injection needle to penetrate at a certain position of the testing member 100 and the specimen may then be supplied into the grooves 3 via the injection needle.

Irradiation of the stored specimen with the testing light and the subsequent measurement may be selected in accordance with the purpose of the test. For example, when measuring the concentration of a component that absorbs light of a certain wavelength, the absorbance at the wavelength may be measured. Specifically, the specimen is irradiated with the testing light which includes light of the wavelength, and the amount of light of the wavelength included in the light which transmits through the specimen may then be measured. On the basis of the absorbance thus obtained, the amount of the above component in the specimen can be estimated. In the case of a test for the turbidity of the specimen, scattering light is detected which is generated when the testing light with which the specimen is irradiated encounters particles included in the specimen and, on the basis thereof, the degree of turbidity due to the particles can be estimated. In the case of a test for an activity state, as an index of the state of cells or blood, of a fluorescent component in the specimen which contains the cells or blood, a desired test can be performed through irradiating the specimen with the testing light which includes exciting light and measuring the fluorescence which is emitted from the fluorescent component due to the irradiation.

The type of testing light can be selected in accordance with the purpose of the test. The testing light may be, for example, laser light. In this case, the wavelength of the testing light may be preferably 200 nm or more and particularly preferably 400 nm or more. From another aspect, the wavelength may be preferably 1,000 nm or less and particularly preferably 800 nm or less. In particular, it may be preferred to use Ar laser (wavelength: 488 to 514 nm) or He—Ne laser (wavelength: 630 nm) as the testing light.

When the testing member 100 is used, the testing member 100 may be cooled or heated in accordance with the specimen to be used and the test to be performed. When the testing member 100 is heated, however, it may be preferred to perform the heating up to a temperature lower than the melting point of each material that constitutes the testing member 100, from the viewpoint of suppressing the deformation of the testing member 100 due to heat.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the testing member 100, the material which constitutes the adhesive layer 30 may be provided between the hydrophilic coating layer 20 and the substrate 2 in the cross section and between adjacent grooves 3 in the plan view.

EXAMPLES

Hereinafter, the present invention will be described further specifically with reference to examples, etc., but the scope of the present invention is not limited to these examples, etc.

<Coating Liquid C-1 for Hydrophilic Coating Layer>

A coating liquid C-1 for hydrophilic coating layer containing an acrylic-based component was prepared by uniformly mixing 50 mass parts (solid content equivalent, here and hereinafter) of dipentaerythritol hexaacrylate (available from Shin Nakamura Chemical Co., Ltd., product name "NK Ester A-DPH"), 125 mass parts of special quaternary ammonium salt-introduced ultraviolet ray-curable acrylate polymer (available from Taisei Fine Chemical Co., Ltd., product name "ACRIT 8WX-030"), 5 mass parts of oligo (2-hydroxy-2-methyl-1-phenyl-propane-1-one) (available from Lamberti S.p.A., product name "Esacure KIP 150"), and propylene glycol monomethyl ether as a diluting solvent. The solid content concentration of the coating liquid C-1 for hydrophilic coating layer was 15 mass %.

<Coating Liquid C-2 for Hydrophilic Coating Layer>

A coating agent (available from COLCOAT CO., LTD., "COLCOAT N-103X," solid content concentration: 2 mass %) containing a siloxane resin as a siloxane component was prepared and employed as a coating liquid C-2 for hydrophilic coating layer.

<Coating Liquid C-3 for Hydrophilic Coating Layer>

A coating agent (available from MARUSYO SANGYO CO., LTD., product name "Selface coat Pura PT3," solid content concentration: 5 mass %) containing a silica-based component was prepared and employed as a coating liquid C-3 for hydrophilic coating layer.

<Coating Liquid P-1 for Adhesive Layer>

An acrylic ester copolymer was prepared by copolymerizing 20 mass parts of 2-ethylhexyl acrylate, 75 mass parts of butyl acrylate, and 5 mass parts of 4-hydroxybutyl acrylate. The molecular weight of this acrylic ester copolymer was measured by the method described later: the weight-average molecular weight (Mw) was 200,000.

A coating liquid P-1 for adhesive layer having a solid content concentration of 20 mass % was prepared by uniformly mixing 100 mass parts of the above acrylic ester copolymer, mass parts of hexamethylene diisocyanate-based isocyanurate (available from Nippon Polyurethane Industry Co., Ltd., product name "CORONATE HX") as a crosslinker, and methyl ethyl ketone as a diluting solvent.

<Coating Liquid P-2 for Adhesive Layer>

A polyester resin (available from TOYOBO CO., LTD., Product name "Vylonal MD-1100," thermoplastic resin, weight-average molecular weight: 20,000, Tg: 40° C.) was prepared and employed as a coating liquid P-2 for adhesive layer.

Here, the previously-described weight-average molecular weight (Mw) refers to a weight-average molecular weight that is measured as a polystyrene equivalent value under the following condition using gel permeation chromatography (GPC) (GPC measurement).

<Measurement Condition>

GPC measurement apparatus: HLC-8020 available from Tosoh Corporation

GPC columns (passing in the order below): available from Tosoh Corporation

TSK guard column HXL-H

TSK gel GMHXL (×2)

TSK gel G2000HXL

Solvent for measurement: tetrahydrofuran

Measurement temperature: 40° C.

Example 1

(1) Production of Substrate

A substrate having three grooves on one surface (see the substrate 2 of FIG. 2) was formed through injection molding of a polycarbonate resin (available from TEIJIN LIMITED, product name "Panlite AD-5503"). The substrate has a disk-like shape of a diameter of 12 cm and a thickness of 1.2 mm, and a circular hole having a diameter of 1.5 cm is provided at the center in the plan view to be concentric with the outer circumference. The three grooves are provided at an interval of 0.25 mm to be concentric with the outer circumference of the substrate in the plan view, and the width w1 and depth d1 of each groove are 200 nm. The distance between the groove closest to the outer circumference of the substrate and the outer circumference of the substrate is 2 cm. As a result of measurement, the arithmetic average roughness (Ra) of the surface of the substrate opposite to the surface formed with the grooves was 120 nm, the transmittance of the testing light (wavelength: 0.63 μm) was 92%, and the haze value was 0.1%.

(2) Formation of Hydrophilic Coating Layer

The entire surface at one side of a polycarbonate film (available from TEIJIN LIMITED, product name "PURE-ACE," thickness: 100 μm, arithmetic average roughness (Ra) of surface opposite to surface to be formed with hydrophilic coating layer: 150 nm, transmittance of testing light (wavelength: 0.63 µm): 90% or more, haze value: 0.3% or less) as a base material was coated with the coating liquid C-1 for hydrophilic coating layer using a Meyer bar. The obtained coating film was dried by heating at 70° C. for one minute and then irradiated with ultraviolet rays for curing under the following ultraviolet irradiation condition, and a hydrophilic coating layer having a thickness of 1,500 nm was thus formed. Through this operation, a laminate comprising the base material and the hydrophilic coating layer was obtained.

<Ultraviolet Irradiation Condition>
Ultraviolet irradiation apparatus: product name "Nitrogen purge small conveyer-type UV irradiation apparatus CSN 2-40" available from GS Yuasa Corporation
Light source: High-pressure mercury lamp
Lamp power: 1.4 kW
Conveyor speed: 1.2 m/min
Illuminance: 100 mW/cm$^2$
Light amount: 240 mJ/cm$^2$
Ultraviolet irradiation under nitrogen atmosphere (oxygen concentration of 1% or less)

(3) Printing of Pressure Sensitive Adhesive

The above laminate was cut out into the same shape in the plan view as that of the substrate prepared in the above process (1). Specifically, the laminate was cut out into a disk-like shape of a diameter of 12 cm with its center provided with a circular hole of a diameter of 1.5 cm concentric with the outer circumference.

Screen printing of the coating liquid P-1 for adhesive layer was performed on the surface of the cut laminate at the hydrophilic coating layer side. Regions to be printed on the laminate were a region outside a circle of a diameter of 80.5 mm concentric with the outer circumference of the laminate in the plan view and a region inside a circle of a diameter of 70 mm concentric with the outer circumference of the laminate in the plan view. After the printing, the coating liquid P-1 for adhesive layer applied on the laminate was dried at 100° C. for one minute. Through this operation, the printed regions were formed with adhesive layers having a thickness of 3 µm, and the other region was formed with a hydrophilic coating layer exposed part having an annular shape in the plan view. A cover film for testing was thus obtained, comprising the base material, the hydrophilic coating layer, and the adhesive layer.

(4) Production of Testing Member

Subsequently, the surface formed with the grooves of the substrate produced in the above process (1) and the surface at the pressure sensitive adhesive layer side of the cover film for testing produced in the above process (3) were attached to each other under the condition of a temperature of 25° C., pressure of 0.5 MPa, and speed of 0.5 m/min. Through this attachment, the three grooves of the substrate fell within the hydrophilic coating layer exposed part of the cover film for testing in the plan view. A testing member was thus manufactured. The testing member manufactured as the above was confirmed to be in a well-fixed state.

Example 2

A testing member was manufactured in the same manner as in Example 1 except that the coating liquid C-2 for hydrophilic coating layer was used and the coating film of the coating liquid C-2 for hydrophilic coating layer was heated at 130° C. for one minute for drying and curing thereby to form a hydrophilic coating layer having a thickness of 60 nm. The testing member thus manufactured was confirmed to be in a well-fixed state.

Example 3

A testing member was manufactured in the same manner as in Example 1 except that the coating liquid C-3 for hydrophilic coating layer was used and the coating film of the coating liquid C-3 for hydrophilic coating layer was heated at 130° C. for one minute for drying and curing thereby to form a hydrophilic coating layer having a thickness of 500 nm. The testing member thus manufactured was confirmed to be in a well-fixed state.

Example 4

A testing member was manufactured in the same manner as in Example 1 except that the coating liquid C-3 for hydrophilic coating layer was used, the coating film of the coating liquid C-3 for hydrophilic coating layer was heated at 130° C. for one minute for drying and curing thereby to form a hydrophilic coating layer having a thickness of 500 nm, the coating liquid P-2 for adhesive layer was used to form an adhesive layer having a thickness of 1 µm by heating at 120° C. for one minute, and the temperature when attaching the substrate and the cover film for testing to each other was 90° C. The testing member thus manufactured was confirmed to be in a well-fixed state.

Comparative Example 1

A testing member was manufactured in the same manner as in Example 1 except that only the base material was cut out in the same manner as in the process (3) of Example 1 and the adhesive layer was formed in the same manner as in the process (3) of Example 1 directly on one surface of the cut base material without forming a hydrophilic coating layer. The testing member thus manufactured was confirmed to be in a well-fixed state.

Comparative Example 2

A testing member was manufactured in the same manner as in Example 1 except that only the base material was cut out in the same manner as in the process (3) of Example 1, one surface of the cut base material was subjected to corona treatment (discharge amount: 556 W·min/m$^2$), and the adhesive layer was formed in the same manner as in the process (3) of Example 1 directly on the corona-treated surface without forming a hydrophilic coating layer. The testing member thus manufactured was confirmed to be in a well-fixed state.

Comparative Example 3

A testing member was manufactured in the same manner as in Example 1 except that the entire surface at one side of the base material was coated with the coating liquid C-2 for hydrophilic coating layer, the obtained coating film was heated at 130° C. for one minute for drying and curing thereby to form a hydrophilic coating layer having a thickness of 60 nm on the base material, a laminate thus obtained of the base material and the hydrophilic coating layer was cut out into a disk-like shape in the same manner as in the process (3) of Example 1, and the entire surface of the cut laminate at the hydrophilic coating layer side was then coated with the coating liquid P-1 for adhesive layer so as not to form a hydrophilic coating layer exposed part when performing screen printing of the coating liquid P-1 for adhesive layer on the surface of the cut laminate. The testing member thus manufactured was confirmed to be in a well-fixed state.

<Exemplary Test 1> (Measurement of Water Contact Angle)

The water contact angle on the surface of the hydrophilic coating layer exposed part of the cover film for testing manufactured in each of Examples 1 to 4 was measured using a fully-automatic contact angle meter ("DM-701" available from Kyowa Interface Science Co., Ltd.) under the following condition. For Comparative Examples 1 and 2, the water contact angle on a region with no adhesive layer of the surface of the base material provided with the adhesive layer was measured in the same manner as the above. These results are listed in Table 1. This test was not conducted for the cover film for testing of Comparative Example 3, which is not provided with a hydrophilic coating layer exposed part and a region with no adhesive layer as the above.

Droplet volume of pure water: 2 μl
Measurement time: 3 seconds after dropping
Image analysis method: θ/2 method <Exemplary Test 2> (Evaluation of Specimen Storage Property)

Cover films for testing were produced as test samples in the same manner as in the cover films for testing manufactured in Examples 1 to 4 and Comparative Examples 1 and 2. The shape of the test samples was a shape as described below. FIGS. 3(a) and 3(b) illustrate the outline of the shape. FIG. 3(a) is a plan view of the cover film for testing 1 as a test sample when viewed from the base material 10 side, and FIG. 3(b) is a cross-sectional view along line 3b-3b of the cover film for testing 1 illustrated in FIG. 3(a). FIGS. 3(a) and 3(b) are presented for the cover films for testing 1 of Examples 1 to 4 and, in Comparative Examples 1 and 2, the hydrophilic coating layer 20 in the figures is omitted. The same applies to FIGS. 4(a) and 4(b) which will be described later.

Figure 3:
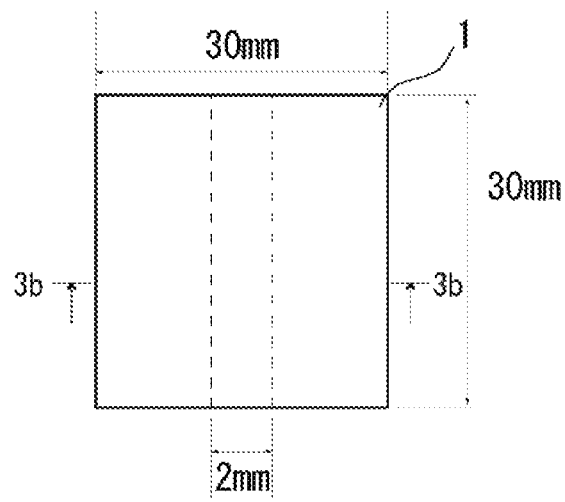
FIGS. 3(a) and 3(b) are respectively a plan view and a cross-sectional view for describing the outline of a testing method according to Exemplary Test 2.
Figure 3:
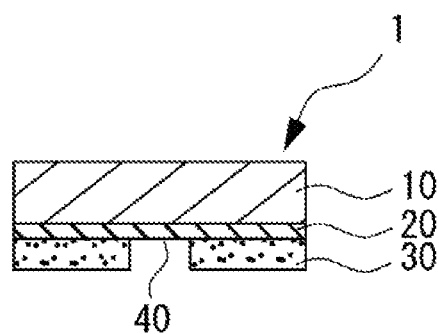

Specifically, in each of Examples 1 to 4, the laminate of the base material and the hydrophilic coating layer as previously produced was cut out into a square shape of 30 mm×30 mm in the plan view, and adhesive layers were provided so that a hydrophilic coating layer exposed part having a rectangular shape of 30 mm×2 mm in the plan view would exist on the surface of the laminate at the hydrophilic coating layer side. Here, the adhesive layers were provided so that the center line of the base material parallel to its one side would overlap with the center line of the hydrophilic coating layer exposed part parallel to its side of 30 mm. FIG. 3 (a) illustrates the sides having a length of 30 mm of the hydrophilic coating layer exposed part 40 by broken lines. The thickness of the adhesive layers to be provided was the same as the thickness of the adhesive layers of the cover films for testing manufactured in Examples 1 to 4. The test samples of the cover films for testing were thus obtained.

On the other hand, in Comparative Example 1, only the base material was cut out into a square shape in the same manner as the above, and adhesive layers were then provided in the same manner as the above to obtain a test sample of the cover film for testing. In Comparative Example 2, only the corona-treated base material was cut out into a square shape in the same manner as the above, and adhesive layers were then provided in the same manner as the above to obtain a test sample of the cover film for testing.

Next, a polycarbonate resin (available from TEIJIN LIMITED, product name "Panlite AD-5503") was injection-molded to produce a flat rectangular substrate. The length of each side in the plan view of the substrate was made longer than the length (30 mm) of one side of each test sample produced as described above.

Figure 4:
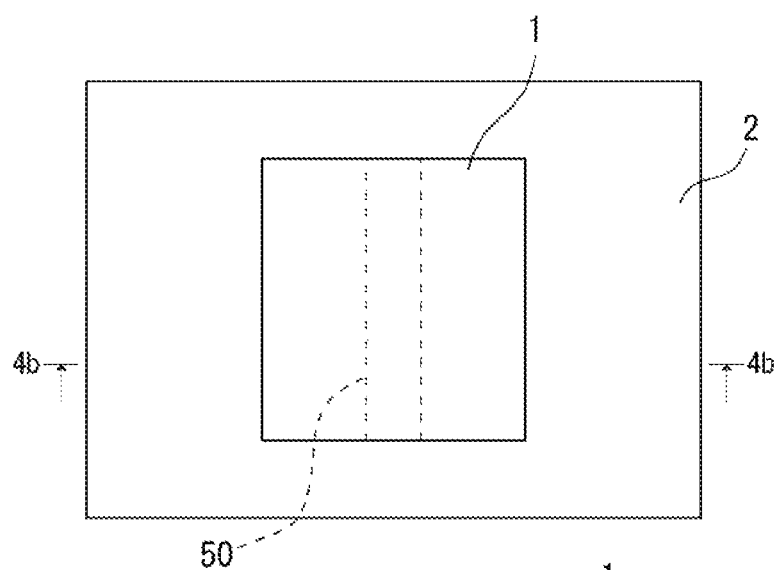
FIGS. 4(a) and 4(b) are respectively a plan view and a cross-sectional view for describing the outline of a testing method according to Exemplary Test 2.
Figure 4:
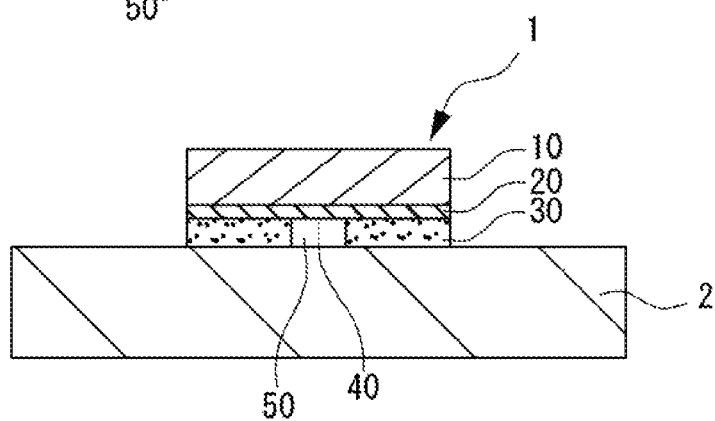

The surface of each test sample produced as the above at the adhesive layer side was attached to one surface of the obtained substrate. FIGS. 4(a) and 4(b) illustrate a state in which the cover film for testing 1 according to a test sample is attached to the substrate 2. FIG. 4 (a) is a plan view of such a state when viewed from the cover film for testing 1 side, and FIG. 4(b) is a cross-sectional view along line 4b-4b of the cover film for testing 1 illustrated in FIG. 4(a). As illustrated in these figures, the attachment was performed such that all the sides of the cover film for testing 1 would not overlap with any side of the substrate 2 in the plan view. By such attachment, a tunnel-like flow channel 50 was formed so as to be surrounded by the hydrophilic coating layer exposed part 40, the substrate 2, and the side surfaces of the adhesive layers 40 and have openings at both longitudinal ends.

Figure 5:
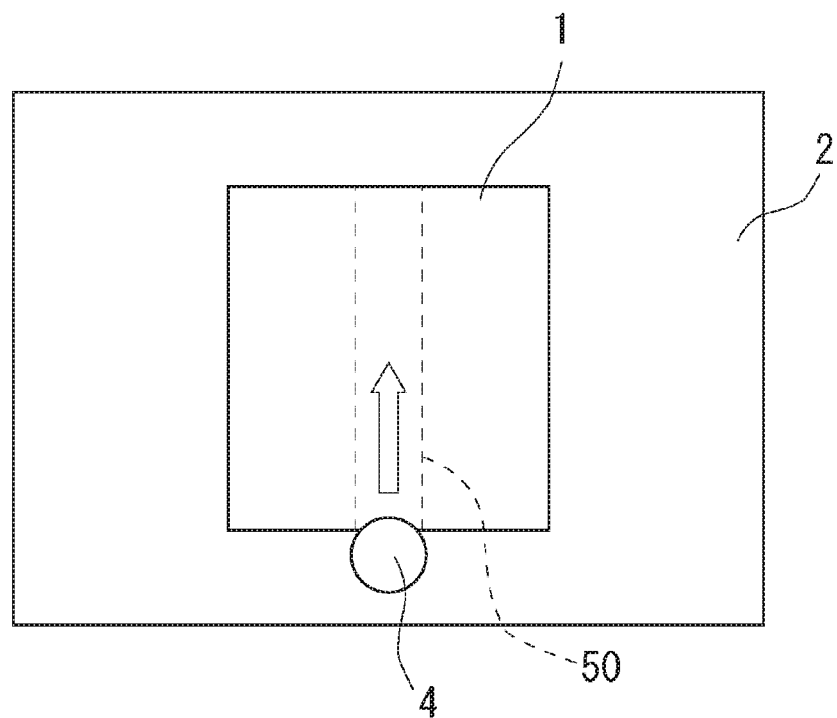
FIG. 5 is a plan view for describing the outline of a testing method according to Exemplary Test 2.

Then, as illustrated in FIG. 5, about 1 ml of pure water was dropped to one opening of the flow channel 50. FIG. 5 illustrates a state in which the cover film for testing 1 is attached to the substrate 2. In particular, FIG. 5 is a plan view of such a state when viewed from the cover film for testing 1 side. As illustrated in FIG. 5, the pure water was dropped to a position in the vicinity of one opening of the above flow channel 50 on the surface of the substrate 2 at the side attached to the cover film for testing 1 so that the water droplet 4 would come into contact with the opening. Then, measurement was performed for the time from when the pure water was dropped to when the pure water arrived at the other opening after moving in the flow channel, as illustrated by the arrow in FIG. 5, from the opening relevant to the contact toward the other opening. The measured time was used to evaluate the specimen storage property based on the criteria below. Results are listed in Table 1.

A: Arrival of pure water at the other opening required three seconds or less after the dropping.

B: Arrival of pure water at the other opening required more than three seconds and five seconds or less after the dropping.

C: Arrival of pure water at the other opening required more than five seconds and ten seconds or less after the dropping.

D: Arrival of pure water at the other opening required more than ten seconds, or the development stopped in the middle of the flow channel and pure water did not arrived at the other opening.

<Exemplary Test 3> (Evaluation of Invasion of Adhesive Layer into Grooves)

Cross sections of grooves of the testing member manufactured in each of the examples and comparative examples were observed using an electron microscope (available from KEYENCE CORPORATION, product name "VE-9800") and evaluation was performed in accordance with the criteria below for the invasion into grooves of the material constituting the adhesive layer.

○: Invasion was less than 20% of the cross sections of grooves.

x: Invasion was 20% or more of the cross sections of grooves.

[Table 1]

As apparent from Table 1, the testing members manufactured in the examples are excellent in the specimen storage property, and the material which constitutes the adhesive layer does not invade into the grooves.

INDUSTRIAL APPLICABILITY

The cover film for testing and the testing member according to the present invention are suitable for a method of optically measuring a slight amount of a specimen.

DESCRIPTION OF REFERENCE NUMERALS

1 . . . Cover film for testing
10 . . . Base material
20 . . . Hydrophilic coating layer
30 . . . Adhesive layer
40 . . . Hydrophilic coating layer exposed part
100 . . . Testing member
2 . . . Substrate
3 . . . Groove
4 . . . Water droplet
50 . . . Flow channel

The invention claimed is:

1. A testing member comprising:
 a substrate having a surface provided with at least one groove extending below the surface of the substrate but not through the substrate and being configured to store a specimen for testing therein; and
 a cover film laminated on the surface of the substrate provided with the at least one groove, the cover film comprising:
  a base material layer;
  a hydrophilic coating layer laminated on an entire surface of the base material layer; and
  an adhesive layer laminated on a surface of the hydrophilic coating layer and extending across the entire surface of the base layer on which the hydrophilic coating layer is laminated, wherein
 the adhesive layer is configured to adhere the cover film to the surface of the substrate without contacting the at least one groove, and
 the testing member has a configuration for performing an optical test for a specimen stored in the at least one groove of the substrate, the configuration including the cover film having a region in which the adhesive layer is absent and the hydrophilic coating layer is exposed.

2. The testing member as recited in claim 1, wherein, in the cover film for testing, the region in which the adhesive layer is absent overlaps with the at least one groove of the substrate in a plan view.

3. The testing member as recited in claim 1, wherein the substrate has transparency to light used in the test.

4. A method of manufacturing the testing member as recited in claim 3, the method comprising:
 a step of forming the hydrophilic coating layer on a surface of the base material layer; and
 a step of partially forming the adhesive layer on a surface of the hydrophilic coating layer opposite to the base material layer, without forming the adhesive layer at a hydrophilic coating layer exposed part in which the adhesive layer is absent and the hydrophilic coating layer is exposed.

5. The method of manufacturing the testing member as recited in claim 4, wherein the adhesive layer is formed by screen printing of a material on the surface of the hydrophilic coating layer opposite to the base material layer, wherein the material forms the adhesive layer.

6. The testing member as recited in claim 1, wherein the adhesive layer is a patterned adhesive layer, and
 the cover film for testing has a region within the patterned adhesive layer through which the hydrophilic coating layer is exposed, and
 the patterned adhesive layer comprises a pressure sensitive adhesive and is configured to adhere the cover film for testing to a surface of the substrate without contacting the at least one groove.

7. The testing member as recited in claim 1, wherein the base material layer has a surface side which is completely flat.

8. A method of manufacturing the testing member as recited in claim 1, the method comprising:
 a step of forming the hydrophilic coating layer on a surface of the base material layer; and
 a step of partially forming the adhesive layer on a surface of the hydrophilic coating layer opposite to the base material layer, without forming the adhesive layer at a hydrophilic coating layer exposed part in which the adhesive layer is absent and the hydrophilic coating layer is exposed.

9. The method of manufacturing the testing member as recited in claim 8, wherein the adhesive layer is formed by screen printing of a material on the surface of the hydrophilic coating layer opposite to the base material layer, wherein the material forms the adhesive layer.

* * * * *